US012606374B2

(12) United States Patent
Austrheim et al.

(10) Patent No.: US 12,606,374 B2
(45) Date of Patent: Apr. 21, 2026

(54) AUTOMATED STORAGE TOWER WITH MULTIPLE ROWS

(71) Applicant: Autostore Technology AS, Nedre Vats (NO)

(72) Inventors: Trond Austrheim, Etne (NO); Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 737 days.

(21) Appl. No.: 17/907,598

(22) PCT Filed: Mar. 23, 2021

(86) PCT No.: PCT/EP2021/057501
§ 371 (c)(1),
(2) Date: Sep. 28, 2022

(87) PCT Pub. No.: WO2021/197941
PCT Pub. Date: Oct. 7, 2021

(65) Prior Publication Data
US 2023/0145325 A1 May 11, 2023

(30) Foreign Application Priority Data

Mar. 31, 2020 (NO) .................................... 20200391
Jun. 4, 2020 (NO) .................................... 20200662

(51) Int. Cl.
*G06F 7/00* (2006.01)
*B65G 1/02* (2006.01)
(Continued)

(52) U.S. Cl.
CPC ........... *B65G 1/1373* (2013.01); *B65G 1/026* (2013.01); *B65G 1/0464* (2013.01)

(58) Field of Classification Search
CPC .... B65G 1/1373; B65G 1/026; B65G 1/0464; B65G 1/0478; B65G 1/065; B65G 2201/0235; B65G 1/00; G06Q 10/08
(Continued)

(56) References Cited

U.S. PATENT DOCUMENTS 3,730,358 A 5/1973 Oji
2011/0031814 A1 2/2011 Giesler
(Continued)

FOREIGN PATENT DOCUMENTS

CN 205274391 U 6/2016
CN 105873434 A 8/2016
(Continued)

OTHER PUBLICATIONS

Wang Shaozeng, First Office Action for Chinese Patent Application No. 2021800261480, dated Nov. 20, 2024, 13 pages, pub. by SIPO, Beijing, China.
(Continued)

*Primary Examiner* — Yolanda R Cumbess
(74) *Attorney, Agent, or Firm* — Baker Botts L.L.P.

(57) ABSTRACT

A storage tower for storing storage containers includes a plurality of horizontally extending container supporting frameworks distributed with vertical offsets. The plurality of horizontal container supporting frameworks includes a first container supporting framework and at least one second container supporting framework arranged beneath and extending parallel to the first container supporting framework. Each of the first and the at least one second container supporting frameworks includes a horizontally extending container support with principal directions in a first direction and an orthogonal second direction. Each container support is configured as a matrix of container spaces with a plurality of columns of container spaces arranged in the first direction
(Continued)

and a plurality of rows of container spaces arranged in the second direction. Each row of container spaces of the first container supporting framework is configured to receive a plurality of storage containers and displays at least one opening extending along the second direction, the at least one opening having an opening size being at least a maximum horizontal cross section of the storage containers to be stored. The at least one opening of the first container supporting framework and the at least one opening of the at least one second container supporting framework can be aligned vertically with respect to each other. At least one container support is displaceable along the second direction. At least one container supporting framework further includes a support displacement device configured to displace the displaceable container support.

21 Claims, 15 Drawing Sheets

(51) Int. Cl.
  *B65G 1/04* (2006.01)
  *B65G 1/137* (2006.01)
(58) Field of Classification Search
  USPC ................................. 700/213–214, 216, 218
  See application file for complete search history.

(56) References Cited

U.S. PATENT DOCUMENTS

| | | | |
|---|---|---|---|
| 2019/0375591 A1* | 12/2019 | Garcia | ................. B65G 1/1373 |
| 2021/0221618 A1 | 7/2021 | Austrheim | |
| 2023/0145325 A1 | 5/2023 | Austrheim et al. | |

FOREIGN PATENT DOCUMENTS

| | | | |
|---|---|---|---|
| CN | 106414278 | A | 2/2017 |
| CN | 108778961 | A | 11/2018 |
| CN | 110809553 | A | 2/2020 |
| DE | 199 42 584 | A1 | 3/2001 |
| EP | 0 246 214 | A2 | 11/1987 |
| GB | 1124673 | A | 8/1968 |
| JP | S57-160803 | A | 10/1982 |
| JP | S63-154502 | A | 6/1988 |
| JP | 2004307125 | A1 | 11/2004 |
| JP | 2015-535517 | A | 12/2016 |
| JP | 7726906 | B2 | 8/2025 |
| WO | 2014/075937 | A1 | 5/2014 |
| WO | 2014/090684 | A1 | 6/2014 |
| WO | 2015/193278 | A1 | 12/2015 |
| WO | 2016/198467 | A1 | 12/2016 |
| WO | 2018/146304 | A1 | 8/2018 |
| WO | 2019/141877 | A1 | 7/2019 |

OTHER PUBLICATIONS

M. Schneider et al., "Communication pursuant to Article 94(3) EPC," pub. by European Patent Office, Rijswijk, Netherlands, dated Aug. 2, 2024, 6 pages.
Seijiro Nakata, Notice of Reasons for Rejection or Japanese Patent Application No. 2022-558435, mailed Mar. 24, 2025, 7 pages, pub. by the JPO.
International Search Report for corresponding International Application No. PCT/EP2021/057501, mailed Jun. 15, 2021 (4 pages).
Written Opinion for corresponding International Application No. PCT/EP2021/057501, mailed Jun. 15, 2021 (6 pages).
Norwegian Search Report in counterpart Application No. 20200391 issued Oct. 31, 2020 (2 pages).
Norwegian Search Report in counterpart Application No. 20200662 issued Jan. 4, 2021 (2 pages).
Anonymous, Office Action in KR1020227037334, mailed Nov. 14, 2025, 10 pages, Korean Intellectual Property Office, Daejeon, Korea.
Bin Zulkepli, Khairullah, Office Action in MYPI2022004632, mailed Nov. 28, 2025, 3 pages, Intellectual Property Corporation of Malaysia, Malaysia.

* cited by examiner

AUTOMATED STORAGE TOWER WITH MULTIPLE ROWS

FIELD OF THE INVENTION

The present invention relates to a storage tower and an automated storage and retrieval system for storage and retrieval of containers from/to such a storage tower. The present invention also relates to a method for storing and retrieving containers in such a storage tower to access deeper laying containers in a more time efficient manner.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201,301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers positioned at or above the target position within the storage column stack 107 have been removed, the container handling vehicle 201,301 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

FIG. 4 shows examples of product items 80 stored in a storage container 106. The storage container 106 illustrated in FIG. 4 has a height Hf, a width Wf and a length Lf. The storage container 106 has a horizontal cross section Af.

For systems containing a large number of bins in each stack, the above mentioned 'digging' may prove both time and space consuming when the target bin is located deep within the grid. For example, if the target bin has location Z=5, the vehicle(s) must lift four non-target bins and place them in other positions, often on top of the grid (Z=0), before the target bin can be reached. Before being replaced back into the grid, the non-target bins may force other robots to choose non-optimized paths to execute their respective operations.

An objective of the present invention is therefore to provide a storage grid and a storage and retrieval system using such a storage grid which may provide a more time efficient storage and retrieval method compared to prior art systems.

SUMMARY OF THE INVENTION

The present invention is set forth in the independent claims and the dependent claims describe certain optional features of the invention.

In particular, the invention concerns a storage tower for storing storage containers. The storage tower comprises a plurality of horizontal container supporting frameworks distributed vertically with vertical offsets.

The plurality of horizontal container supporting frameworks comprises a first horizontal container supporting framework and at least one second container supporting framework arranged beneath and parallel to the first container supporting framework.

The first and the at least one second container supporting frameworks comprises a horizontally extending container support with principal directions in a first direction and an orthogonal second direction, each container support being configured as a matrix of container spaces with a plurality of columns of container spaces arranged in the first direction and a plurality of rows of container spaces arranged in the second direction, Further, each row of container spaces of at least the first container supporting framework is configured to receive a plurality of storage containers and displays at least one opening extending along the second direction, the at least one opening having an opening size being at least a maximum horizontal cross section of the storage containers to be stored.

The at least one opening, e.g., the total area of the at least one opening in each row, of the first container supporting framework and the at least one opening of the at least one second container supporting framework can be aligned vertically with respect to each other.

At least one container support is displaceable along the second direction.

At least one container supporting framework further comprises a support displacement device configured to displace the displaceable container support.

It is thus achieved a storage tower where remotely operated vehicles can pick storage containers without having to dig.

It is thus achieved a storage tower that can provide a more time efficient delivery of product items to a customer or other recipient of an item stored in a storage container.

It is thus achieved a storage tower that can provide a high throughput of product items, such as product items on sale or other products with a high demand.

The horizontal container supporting frameworks may have repeating geometry, particularly the second container supports.

The horizontal container supporting frameworks may be seen to provide a set of displaceable storage shelves for storage containers, the contents of which can be accessed easily through aligning openings in the container supporting frameworks above with a target storage container below.

The container supports may be a plate, e.g. one continuous plate or several plates connected to form the container support. In other words, the container support may provide a continuous surface on which to place the storage containers. Alternatively, the container support may have a frame structure, i.e. without inner structure or material between frame members of the frame structure. Furthermore, the container support may be a combination of the two. The container supports in the storage tower may also be a mixture of the two.

The matrix of container spaces could be an imaginary division primarily set by the size of the storage containers. The size of the matrix of container spaces is linked to the number of rows and columns of the matrix. A matrix comprising l rows and m columns may extend a distance along the first direction X substantially equal to $l*L_f$ and extend a distance along the second direction Y substantially equal to $m*W_f$. Alternatively, a matrix comprising l rows and m columns may extend a distance along the first direction X substantially equal to $l*W_f$ and extend a distance along the second direction Y substantially equal to $m*L_f$. The extend of the matrix thus substantially corresponds to the size and number of the storage containers. If a rail system is used, adjacent storage containers will be spaced apart at least corresponding to the width of each rail. The total width of the spacing will depend on the number of rows and columns of the matrix, i.e. the number of storage containers and thus the number of spacings. The total width of the rails may be calculated as $(l-1)*W_r$ or $(m-1)*W_r$. $W_r$ being the width of each rail. The spacing of the storage containers will add to the size of the matrix of container spaces in both the first direction X and the second direction Y. If a transport system (typically comprising a crane) is used, the storage containers may be stored closer together as compared to the system with rails. Any spacing of the storage containers should be added to the size of the matrix also when a transport system is used.

The opening or openings of one row of container spaces or some of the rows may be staggered (i.e., not all openings being aligned along the first direction X). The arrangement of openings may shift from one container support to another.

If the storage tower only comprises two container supports, the uppermost container support may be movable to align its opening with the lowermost container support without the lower most container support being movable.

The at least one second container supporting framework may comprise a plurality of container supports.

One example is a storage tower where each of the second container supporting frameworks comprise two container supports each being configured as a matrix of container spaces with four rows and three columns (i.e. a 4×3 matrix). The two container supports could be independently displaceable along the second direction Y such that an opening can be provided between the rows of the two container supports. Alternatively, by displacing one container support at the time, an opening may be provided at either end in the second direction Y of the container supporting framework. The first container supporting framework may comprise one container support being configured as a matrix of container spaces with four rows and five columns (i.e. a 4×5 matrix). A target container positioned in a third container supporting framework, having the same configuration as the second, could then be accessed through the openings provided at either end in the second direction Y of the container supporting framework. Both container supports of the second container supporting frameworks should then be displaceable by two spaces.

Each row of container spaces of the first container supporting framework and preferably also the at least one second container supporting frameworks may be configured to receive a plurality of storage containers and displays at least one opening extending along the second direction, the at least one opening having an opening size being at least a maximum horizontal cross section of the storage containers to be stored.

The vertical offset of each container supporting framework may vary within the same storage tower. Different container supporting frameworks of the same storage tower may be configured for storing of storage containers of different heights. In order to utilize the available space in the storage tower in an optimal way, container supporting frameworks configured for storing of storage containers of different heights may preferably have different vertical offsets.

The support displacement device may comprise a linear actuator, a gearwheel drive (e.g. rack and pinion), chain drive, a belt drive or any combination thereof. This includes ball-screws and cam type rotary devices that cause linear movement. It should also be understood as including electric, hydraulic and pneumatic actuators.

The support displacement device may be driven wheels arranged on the container support or on the container supporting framework.

The support displacement device may comprise a motor for driving the linear actuator, gearwheel drive, chain drive, belt drive or any combination thereof, the motor being arranged outside a horizontal extent of the respective container supporting framework containing at least one displaceable container support to be displaced.

The displacement device may comprise a centrally aligned actuator that is positioned to push and pull the container support. Alternatively, the displacement device may be arranged at an edge of the container supporting framework, preferably opposite edges.

The displacement devices of adjacent container supporting frameworks may be arranged at opposite edges.

The displacement device may be a direct drive mechanism arranged on the container support. The direct drive may e.g. be connected to rollers arranged on the container support.

Each container support may further comprise a plurality of horizontal movement shelf rollers rotationally arranged on at least one side of the container support extending along the second direction, the horizontal movement shelf rollers having a horizontal axis of rotation along the first direction.

Furthermore, each of the plurality of container supporting frameworks may further comprise a set of guiding tracks arranged on each side of the container supporting frameworks along the second direction, the set of guiding tracks being oriented with their longitudinal direction parallel to the second direction.

Furthermore, each guiding track may comprise a horizontal part for supporting and guiding the plurality of horizontal movement shelf rollers.

The horizontal movement shelf rollers may e.g. be a number of wheels or linear guide rails.

Each container support may further comprise a plurality of shelf guides, the plurality of shelf guides being arranged on at least the side of the container support comprising the plurality of horizontal movement shelf rollers.

Furthermore, each guiding track may comprise a vertical part for guiding of the plurality of shelf guides.

The shelf guide may e.g. be a number of wheels, linear guide rails or sliding surfaces (i.e. surfaces with low friction against contacting surfaces typically of the guiding track).

Each row may comprise vertical guide plates arranged at least partly around the perimeter of each of the at least one opening.

The vertical guide plates may be configured so that a storage container being lifted or lowered into the respective opening is aligned in the horizontal plane.

The at least one opening displayed by each row of container spaces may be a separate opening.

The at least one opening of each parallel arranged row of container spaces within the at least one container support may be horizontally aligned along the first direction.

The at least one opening displayed by each row of container spaces of at least one of the container supports may be merged together to form a continuous opening extending along the first direction to define an area substantially equal to one column of container spaces.

The container supports may also comprise a mixture of separate openings and merged openings.

At least one of the plurality of horizontal container supporting frameworks may comprise at least one container support having a horizontal extent smaller than the horizontal extent of the container supporting framework.

The extent of the container supporting frameworks in the second direction may exceed the extent of the container supports with a length substantially equal to $W_f*i$, where i is an integer, preferably i=1 or i=2.

The at least one displaceable container support may be displaceable a distance along the second direction substantially equal to $Wf*i$, where i is an integer, preferably i=1 or i=2.

Each row of container spaces may be configured to receive an equal number of storage containers on either side of the at least one opening. Such a row would not have an opening positioned at the end.

Each row of container spaces may display one opening and be configured to receive two or more storage containers on each side of the opening.

Each row may display a plurality of openings distributed with an offset corresponding to d+1 grid cells in the second direction, where d is an integer of 1 or more.

The matrix of container spaces of each container support may have an equal number of rows and columns.

The horizontal area of the at least one second container support may be the same as the horizontal area of any further second container supports.

The rows of container spaces of the first and the at least one second container support may have equal distributions of the at least one opening.

The lowermost container support may have at least one row of container spaces without an opening.

At least one of the container supports may comprise a plurality of sensor devices for sensing the presence of a storage container. The sensor devices may be distributed across the matrix of container spaces.

The sensors arranged on the storage container support or the container supporting framework may communicate with the control system.

The sensor device may be selected from a group comprising piezoelectric sensors, weight sensors, magnetic sensors (would require the storage container to be made of a magnetic material or to be provided with a magnet device), vision sensors, light sensors, motion sensors.

At least one of the container supports may comprise a sensor device for sensing the displacement of the container support relative to the container supporting framework.

The storage containers may be supported by at least one support plate and/or a plurality of support beams oriented in the first direction and/or the second direction.

The storage tower may further comprise a transport mechanism arranged above the uppermost container supporting framework at a first vertical offset. The offset providing a vertical gap between a lowermost point of the transport mechanism and an uppermost surface of the container space of the first container support being at least a maximum height of the storage containers to be stored.

Instead of a vehicle with wheels moving on a rail system, the transport system may comprise a crane moveable in X and Y-directions over the storage tower. For example, the crane may be moveable in the first direction on a sliding bar extending across the width of the storage tower. Movement in the second direction may be achieved by sliding the sliding bar along two fixed bars extending in the second direction on both sides of the storage tower. The crane may be a container handling vehicle with a cantilever construction supported on two parallel sliding bars.

It is thus achieved a storage tower that may operate despite not being level. The transport mechanism is less prone to derailing than the vehicle moving on wheels. The storage tower may thus be suitable for operations at sea, e.g. onboard a vessel.

The storage tower may further comprise a rail system arranged above the first container supporting framework at a first vertical offset. The offset providing a vertical gap between a lowermost point of the rail system and a uppermost surface of the container space of the first container support being at least a maximum height of the storage containers to be stored.

At least one of the container supporting frameworks may be arranged at a distance below a lower edge of the above adjacent rail system and/or a lower edge of an above adjacent container supporting framework, corresponding to a height that is equal or higher than a maximum height of a stack of several storage containers.

The rail system may provide access to the target openings of the storage tower and to adjacent storage towers and/or storage grids without having to cover the entire horizontal extent of the storage tower.

The invention also concerns an automated storage and retrieval system configured to store a plurality of storage containers.

The rail aligning the storage tower with the rail system such that each of the container spaces of the first container support can be vertically aligned below a grid opening of the cantilever part The automated storage and retrieval system may comprise an above-described storage tower.

Furthermore, the automated storage and retrieval system may comprise a plurality of storage containers supported on the plurality of horizontally arranged container supporting frameworks.

Furthermore, the automated storage and retrieval system may comprise a remotely operated vehicle configured to move laterally above the plurality of container supporting frameworks, wherein the remotely operated vehicle comprises a lifting device configured to grab and vertically lift a storage container.

Furthermore, the automated storage and retrieval system may comprise a control system configured to monitor and control wirelessly movements of the remotely operated vehicle.

It is thus achieved an automated storage and retrieval system where remotely operated vehicles can pick storage containers without having to dig.

It is thus achieved an automated storage and retrieval system that can provide a more time efficient delivery of product items to a customer or other recipient of an item stored in a storage container.

It is thus achieved an automated storage and retrieval system that can provide a high throughput of product items, such as product items on sale or other products with a high demand.

The automated storage and retrieval system may further comprise a storage grid comprising:
   a plurality of vertical storage columns for stacking storage containers one on top of one another, and a rail system on which a plurality of container handling vehicles may be operated, the rail system being arranged above the plurality of storage columns,
   wherein storage containers stored in the storage columns are accessible by the container handling vehicles through grid openings in the rail system,
   the rail system may comprise a cantilever part with a horizontal extent being equal the difference between the horizontal extent of the rail system and the horizontal extent of the plurality of storage columns.

One or more of the storage towers may be at least party arranged below the cantilever part of the rail system and positioned such that each of the container spaces of the first container support can be vertically aligned below a grid opening of the cantilever part.

Alternatively, the automated storage and retrieval system may further comprise a storage grid comprising:
   a plurality of vertical storage columns for stacking storing containers one on top of another, and
   a transport mechanism wherein the remotely operated vehicle is a crane being moveable along a sliding bar arranged in parallel to the first direction,
   the sliding bar having two opposite ends being movable along two fixed bars arranged in parallel to the second direction,
   the transport mechanism being arranged above the plurality of storage columns,
   the transport mechanism comprises a cantilever part with a horizontal extent being equal the difference between the horizontal extent of the transport mechanism and the horizontal extent of the plurality of storage columns, One or more of the storage towers may be at least partly arranged below the cantilever part of the traveling crane system.

It is thus achieved a storage and retrieval system combining the prior art grid and the inventive grid, i.e. a combination of a high runner grid and a low runner grid in which product items can be arranged according to their turnover.

It is thus achieved a storage and retrieval system combining storage capacity with time efficient delivery of product items to a customer or other recipient of an item stored in a storage container, e.g. where orders can be picked from the low runner grid, with high storage capacity, before intermediately stored (buffered) in the high runner grid, with time efficient delivery of product items to the customer, and subsequently efficiently delivered to the customers on their arrival.

A high runner storage tower is configured for high frequency of storage containers entering and leaving the storage tower. The storage containers will typically be stored for a shorter period in the high runner storage tower when compared to a low runner storage grid. The high runner storage tower is particularly suited for high demand products. The high runner storage tower provides quick access and is therefore suited for time critical storages. The high runner storage tower is less space efficient than a low runner storage grid.

A low runner storage grid is more space efficient when compared to the high runner storage tower. The storage containers will typically be stored for a longer period in the lower runner grid when compared to a high runner storage tower. The low runner storage grid has slower access compared to the high runner storage tower and is therefore better suited for a less time critical storage.

Hence, the high runner storage tower and the low runner storage grid complement each other.

The automated storage and retrieval system may further comprise a rail system arranged above the uppermost container supporting framework at a first vertical offset. The offset providing a vertical gap between a lowermost point of the rail system and a uppermost surface of the container space of the first container support being at least a maximum height of the storage containers to be stored.

At least one of the container supporting frameworks may be arranged at a distance below a lower edge of the above adjacent rail system and/or a lower edge of an above adjacent container supporting framework, corresponding to a height that is equal or higher than a maximum height of a stack of several storage containers.

The invention also concerns a method for storing and retrieving storage containers from an automated storage and retrieval system. The automated storage and retrieval system may be one as described above.

The plurality of horizontal container supporting frameworks preferably comprises a number of j parallel container supporting frameworks, where j is an integer of 2 or more.

The at least one container support of the at least one second container supporting framework are preferably displaceable along a second direction orthogonal to the first direction.

The method may comprise the following steps:

A. moving the remotely operated vehicle to a position where its lifting device is positioned in vertical alignment above either
a) a target storage container situated on the first container supporting framework, or
b) if the target storage container is situated on one of the j–1 parallel container supporting frameworks beneath the first container supporting framework, a target opening of the first container supporting framework being vertically alignable with the target storage container,
B. if the target storage container is not positioned in vertical alignment below the target opening,
a) displacing the displaceable container support of the container supporting framework, on which the target storage container is supported in the second direction to position the target storage container in vertical alignment below the target opening of the first container supporting framework or
b) if the at least one container support of the first container supporting framework is displaceable along the second direction, displacing the at least one displaceable container support of the one or more container supporting frameworks situated above, and having the same position in the first direction as the row of the displaceable container support, on which the target storage container is supported, an equal distance in the second direction opposite of the direction in a) to position the target storage container in vertical alignment below the target opening of the first container supporting framework or
c) if the at least one container support of the first container supporting framework is displaceable along the second direction, displacing both the target storage container supporting displaceable container support as described in step a) and the above arranged one or more displaceable container supports as described in step b) to position the target storage container in vertical alignment below the target opening,
C. grabbing and lifting the target storage container by use of the lifting device and D. moving the remotely operated vehicle with the target storage container to a horizontally different location.

In the method for storing and retrieving storage containers from an automated storage and retrieval system, step B may be performed prior to or simultaneously with step A. If step B.c) is performed after step A, it may be required to reposition the remotely operated vehicle to a position where its lifting device is positioned in vertical alignment above a target opening of the first container supporting framework being vertically alignable with the target storage container.

It is thus achieved a method for picking storage container with remotely operated vehicles without having to dig.

It is thus achieved a method providing a more time efficient delivery of product items to a customer or other recipient of an item stored in a storage container.

It is thus achieved a method providing a high throughput of product items, such as product items on sale or other products with a high demand.

If the remotely operated vehicle or the crane is carrying a storage container to be stored in the automated storage and retrieval system, either before or after retrieval of the target storage container, the method may comprise the steps of:

E. moving the remotely operated vehicle to a position where its lifting device is positioned in vertical alignment above either
a) a vacant container space of the first container supporting framework, or
b) if the vacant container space is situated on one of the j–1 parallel container supporting frameworks beneath the first container supporting framework, a target opening of the first container supporting framework being vertically alignable with the vacant container space,
F. if the vacant container space is not positioned in vertical alignment below the target opening,
a) displacing the displaceable container support of the container supporting framework, on which the vacant container space is situated in the second direction to position the vacant container space in vertical alignment below the target opening of the first container supporting framework or
b) if the at least one container support of the first container supporting framework is displaceable along the second direction, displacing the at least one displaceable container support of the one or more container supporting frameworks situated above, and having the same position in the first direction as the row of the displaceable container support, on which the vacant container space is situated, an equal distance in the second direction opposite of the direction in a) to position the vacant container space in vertical alignment below the target opening of the first container supporting framework or
c) if the at least one container support of the first supporting framework is displaceable along the second direction, displacing both the displaceable container support of the vacant container space as described in step a) and the above arranged one or more displaceable container supports as described in step b) to position the vacant container space in vertical alignment below the target opening,
G. lowering the carried storage container into position on the vacant container space by use of the lifting device.

In the method for storing and retrieving storage containers from an automated storage and retrieval system, step F may be performed prior to step E. If step F.c) is performed after step E, it may be required to reposition the remotely operated vehicle to a position where its lifting device is positioned in vertical alignment above a target opening of the first container supporting framework being vertically alignable with the target storage container.

If the automated storage and retrieval system comprises a storage grid containing a target storage container, the method may comprise the steps of:

Picking the target storage container from the storage grid, e.g. as described in the background section.

Storing the target storage container in the storage tower according to the above-described method.

Retrieving the storage container from the storage tower according to the above-described method.

If two target storage containers are situated on one of the j−1 parallel container supporting frameworks and horizontally aligned in the first direction, and the system further comprises a second remotely operated vehicle, and the control system may be configured to monitor and control wirelessly movements of the second remotely operated vehicle, the method may further comprise the steps of:

A2. moving the second remotely operated vehicle to a position where its lifting device is positioned in vertical alignment above a target opening of the first container supporting framework being vertically alignable with the second target storage container, C2. grabbing and lifting the second target storage container by use of the lifting device of the second remotely operated vehicle and D2. moving the second remotely operated vehicle with the second target storage container to a horizontally different location.

When a storage container is being positioned in a vacant container space or a target storage container is being retrieved from the storage tower, the other container spaces of the same row of container spaces are not available for other remotely operated vehicles to pick from. The same applies for the other rows of the same matrix of container spaces. To avoid a queuing, the above-described storage and retrieval system could therefore preferably have specific remotely operated vehicles covering the container spaces of the storage towers.

The control system may be configured to coordinate simultaneous picking by multiple remotely operated vehicles covering the same container spaces of one or several storage towers, as described in the method above, further efficiencies may be achieved.

The control system may be configured to coordinate that two remotely operated vehicles simultaneously pick target storage containers from the same container support. Alternatively, two remotely operated vehicles simultaneously store two storage containers in the same container support. As a further alternative, one remotely operated vehicle retrieving a target storage container from the same container support as another remotely operated vehicle simultaneously is storing a storage container.

The invention also concerns a method for installing a storage tower in an automated storage and retrieval system. The storage tower and the automated storage and retrieval system may be one in accordance with the above description.

The automated storage and retrieval system may comprise:

a storage grid, and a vehicle movements system having a larger horizontal extent than the storage grid.

The method may comprise the steps of:

assembling at least a part of the storage tower according to the above description underneath the cantilever part of the vehicle movement system.

It is thus achieved a storage tower that can be retrofitted to existing storage and retrieval systems.

The vehicle movement system may comprise a rail system, and the method may then further comprise the step of:

aligning the storage tower with the rail system such that each of the container spaces of the first container support can be vertically aligned below a grid opening of the cantilever part.

The above-described automated storage and retrieval system may be used for delivering items arranged within the storage containers stored in the storage grid directly to end users.

The cantilever part of a rail system does not need to extend the entire horizontal extent of the storage tower. The cantilever part of the rail system may e.g. only extend enough to reach the target openings of the storage tower.

Due to the configuration of the container supports, i.e. the matrix of container spaces, vertical pillars cannot be positioned between the rows of container spaces or between the columns of container spaces of the same container support. This means that there will be a larger span between the vertical pillars of the storage tower, and thus higher loads on each vertical pillar as compared to the upright members of the prior art storage grid.

The rail system, when it is present, must extend over and support the weight of the remotely operated vehicles over a larger area than with a conventional storage grid where each grid space is being supported at the corners by upright members.

To withstand the increasing loads, the vertical pillars and/or the rail system may need to be reinforced as compared to the prior art upright members and rail system.

A remotely operated vehicle approaching the storage tower to pick a target storage container typically brings another storage container that is to be stored in the storage and retrieval system. Before the remotely operated vehicle can pick the target storage container, the vehicle held storage container is advantageously placed in a vacant container space within the same storage tower. This is a process typically referred to as an exchange process. Such an exchange process can take place in the storage tower and the automated storage and retrieval system as described above.

By having fewer storage containers than there are available container spaces within the storage system, there will always be at least one vacant container space. Vacant container spaces will also be dynamically generated as remotely operated vehicles pick storage containers from within the storage tower. If there are no vacant container spaces in the storage system, the remotely operated vehicle must either refrain from bringing another storage container from for example the port column or place the held storage container on top of the storage tower. Both alternatives suffer disadvantages in respect of time efficiency.

The vacant container space (into which the storage container is to be placed) and the target storage container are preferably horizontally closest to the same target opening. In this way the remotely operated vehicle does not need to move between the two operations during the same exchange process. Even more preferred, in addition to being available through the same target opening, the vacant container space and the target storage container can be located on the same container support. In this way the remotely operated vehicle can have a minimum movement of its lifting device between the two operations of the exchange process. Thus, the exchange process time will not be prolonged due to conflicting displacements of the lifting device and the container support of the target storage container.

When the openings are merged the guide structure and the rail system or transport system, if used, may be configured to allowing sideways movement of the lifting device while the lifting device is still lowered into the storage tower. This will save time in an exchange process where a carried storage container is positioned in a row next to the target storage container. The remotely operated vehicle may then move sideways without having to raise and lower the lifting device.

After positioning the previously held storage container in the vacant container space, the lifting device is retracted to allow displacement of the container supports, i.e. return of the container support of the previously vacant container and deployment of the container support of the target storage container such that the target storage container is situated beneath the target opening. If the lifting device is retracted higher than just above the container supporting framework of the target storage container, the exchange process would become less time efficient.

If the target storage container is positioned deeper than the vacant container space, the container support of the target storage container can be deployed prior to the retraction of the lifting device and the displacement back to the initial position of the container support of the previously vacant container space.

After the target storage container has been lifted above the container supporting framework, the container support can be displaced back to its initial position.

BRIEF DESCRIPTION OF THE DRAWINGS

The following drawings depict alternatives of the present invention and are appended to facilitate the understanding of the invention. The drawings show embodiments of the invention, which will now be described by way of example only, where.

DETAILED DESCRIPTION OF THE INVENTION

Figure 1:
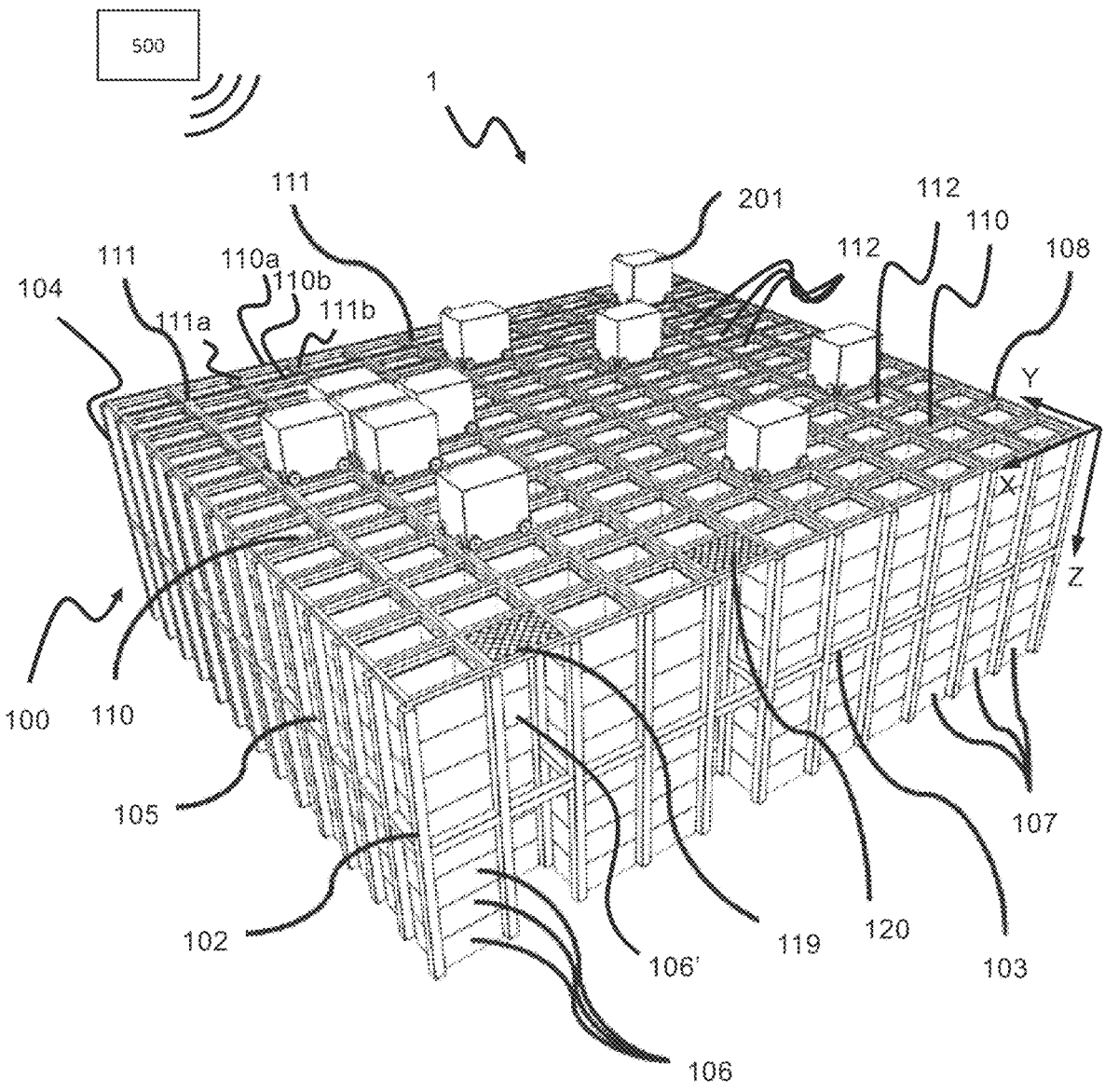
FIG. 1 is a perspective view of a framework structure of a prior art automated storage and retrieval system.
Figure 2:
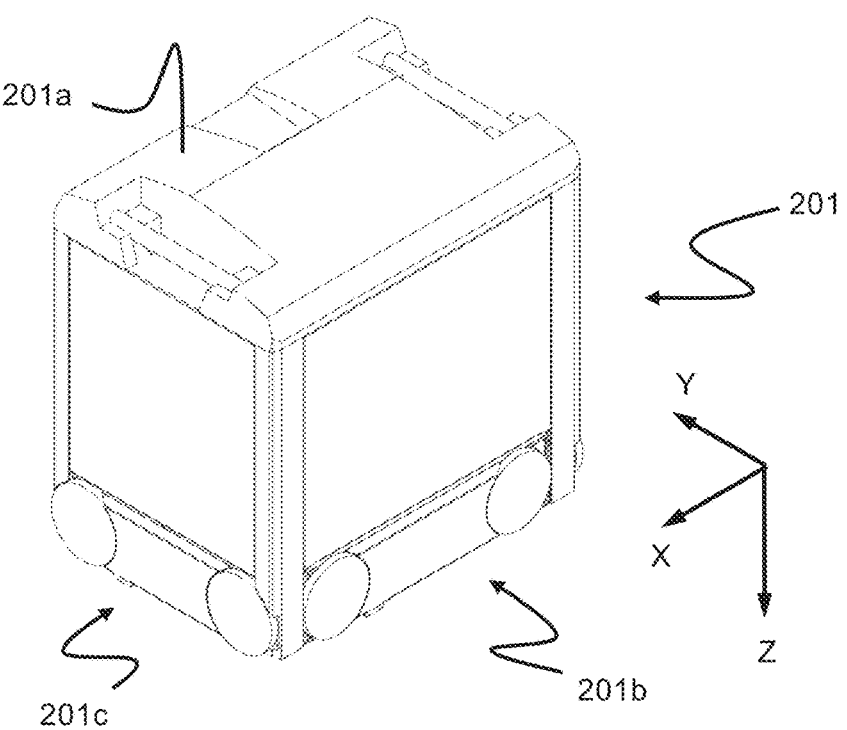
FIG. 2 is a perspective view of a prior art container handling vehicle having a centrally arranged cavity for carrying storage containers therein.
Figure 3:
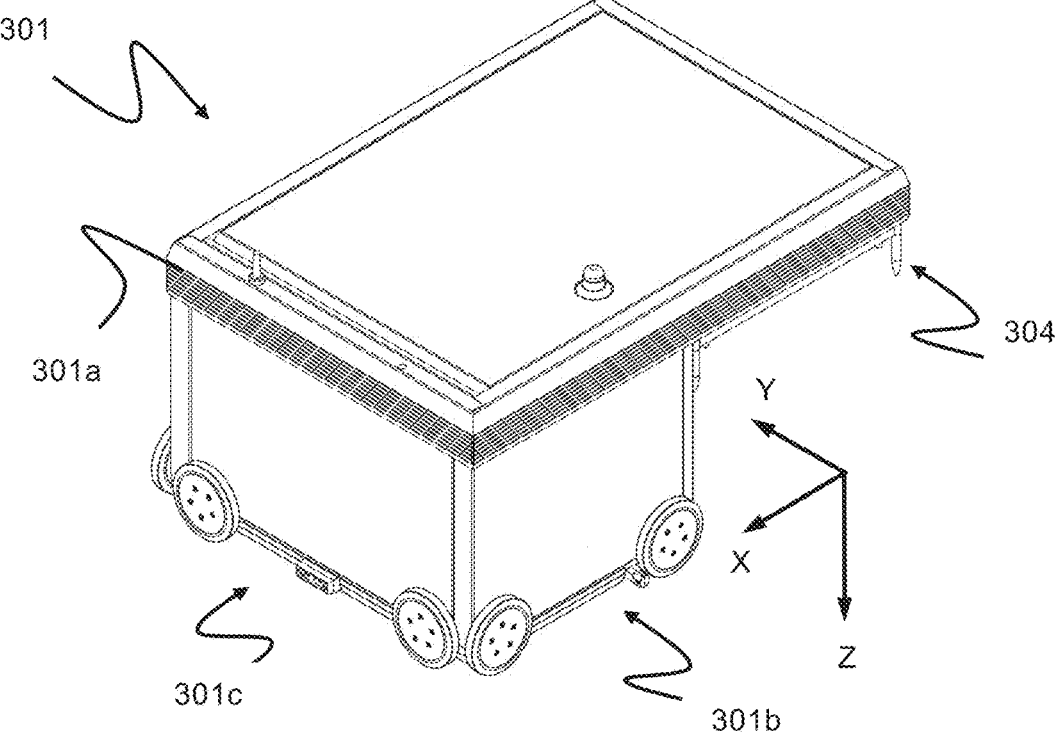
FIG. 3 is a perspective view of a prior art container handling vehicle having a cantilever for carrying storage containers underneath.
Figure 4:
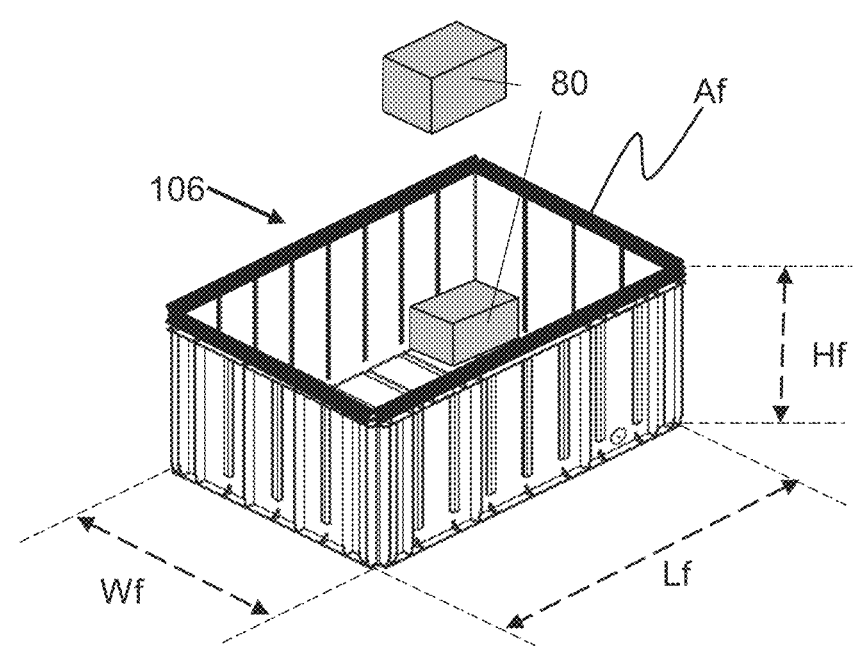
FIG. 4 is a perspective view of a storage container and product items stored in the storage container.
Figure 5:
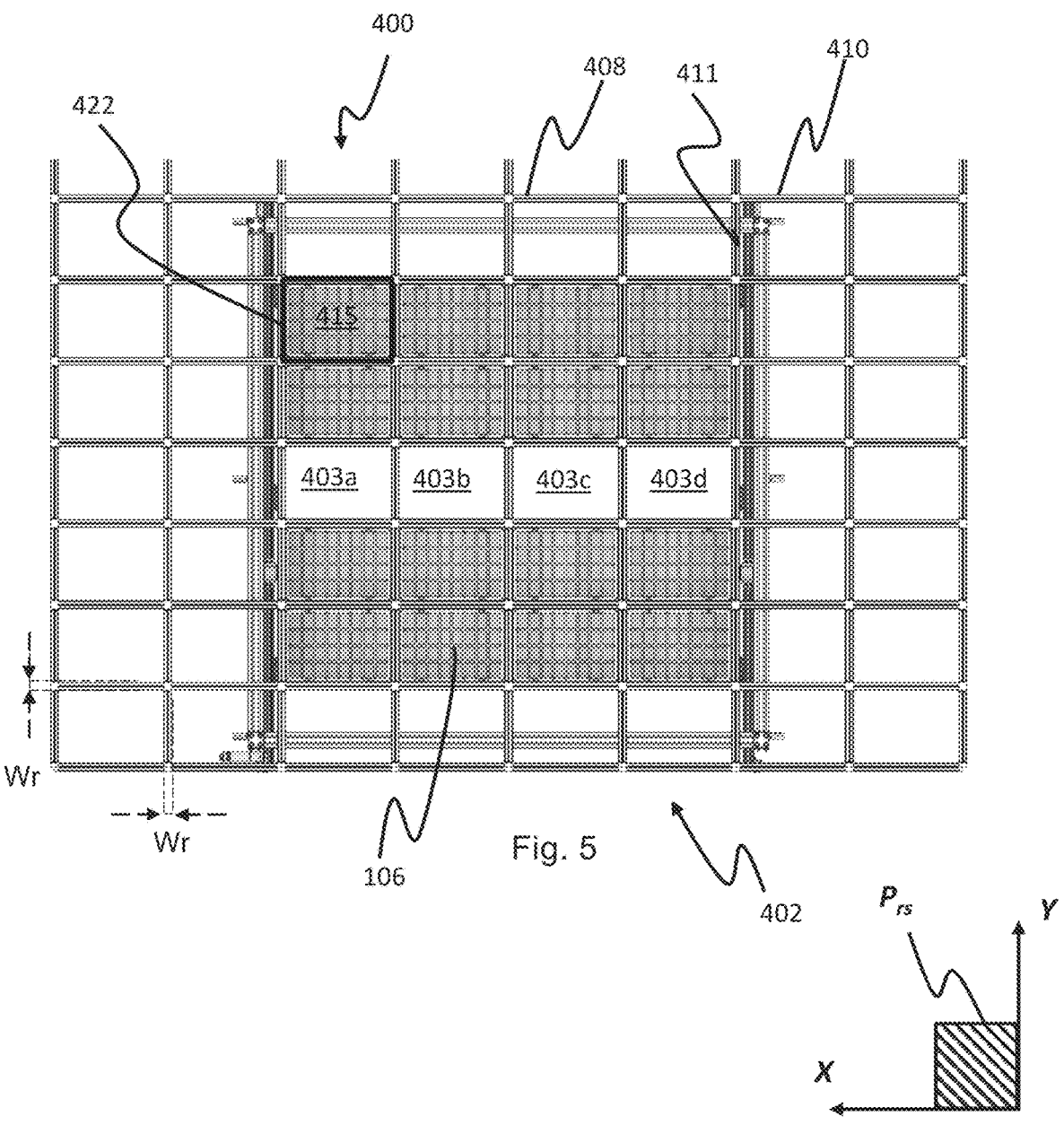
FIG. 5 is a top view of a storage system where all container supports of a storage tower are vertically aligned.

In the following, different alternatives will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

With particular reference to FIG. 5-6 and FIG. 12-15, the inventive storage and retrieval system 1 comprises remotely operated vehicles 301 operating on a rail system 408 comprising a first set of parallel rails 410 arranged to guide movements of the remotely operated vehicles 301 in a first direction X across a storage tower 400 and a second set of parallel rails 411 arranged perpendicular to the first set of rails 410 to guide movement of the remotely operated vehicles 301 in a second direction Y which is perpendicular to the first direction X. The storage containers 106 stored within the storage tower 400 are accessed by the remotely operated vehicles 301 through grid openings 415 in the rail system 408. Each grid opening 415 of the rail system 408 is enclosed by a grid cell 422. The rail system 408 extends in a horizontal plane $P_{rs}$.

Figure 6:
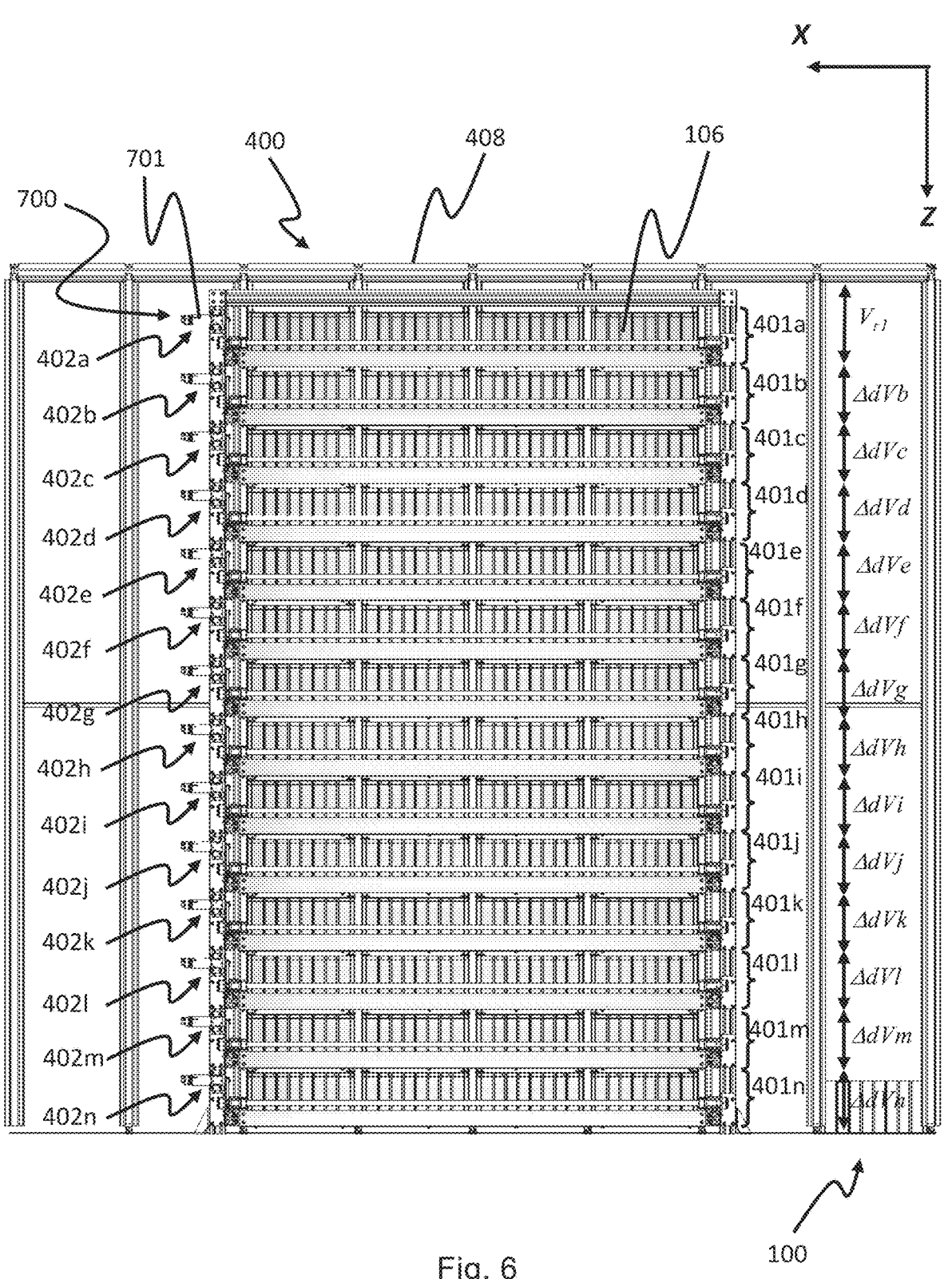
FIG. 6 is a side view of the storage system of FIG. 5.

As best seen in FIG. 6, the storage containers 106 are stored on a plurality of container supporting frameworks 401 distributed in a Z direction below the rail system 408 with a vertical offset indicated by $V_{r1}$ (i.e. the offset between the lower edge of the rail system 408 and the lower edge for the first container supporting framework 401a directly beneath the rail system 408) and a vertical offset indicated by $\Delta dVb\text{-}n$ (i.e. the offset between the lower edges of two adjacent container supporting frameworks 401a-n).

The vertical offsets $V_{r1}$ and $\Delta dVb\text{-}n$ may be selected to provide a height that is equal to or higher than a maximum height of one storage container 106 or a stack 107 of several storage containers 106 or equal to or higher than a maximum height of different storage containers 106 stored in respective container supporting frameworks 401. As an example, the first container supporting framework 401a may be adapted to store stacks 107 of storage containers 106 while the below situated container supporting frameworks 401b-n may be adapted to store single (unstacked) storage containers 106. As a further example, several or all container supporting frameworks 401 of the tower 400 may be adapted to store stacks 107 of several storage containers 106. The different container supporting frameworks 401 of the same tower 400 may be configured to store stacks 107 of unequal numbers of storage containers 106. The vertical space (i.e. the available height) required for one or several container supporting frameworks 401 of the tower 400 to be adapted to store a stack 107 of several storage containers 106 may be obtained by reducing the total number of container supporting frameworks 401 as compared to a configuration of the tower 400 where all container supporting frameworks 401 are adapted to store single (unstacked) storage containers 106.

FIG. 6 shows a storage tower 400 where each container supporting framework 401a-n comprises one horizontally extending container support 402.

Figure 7:
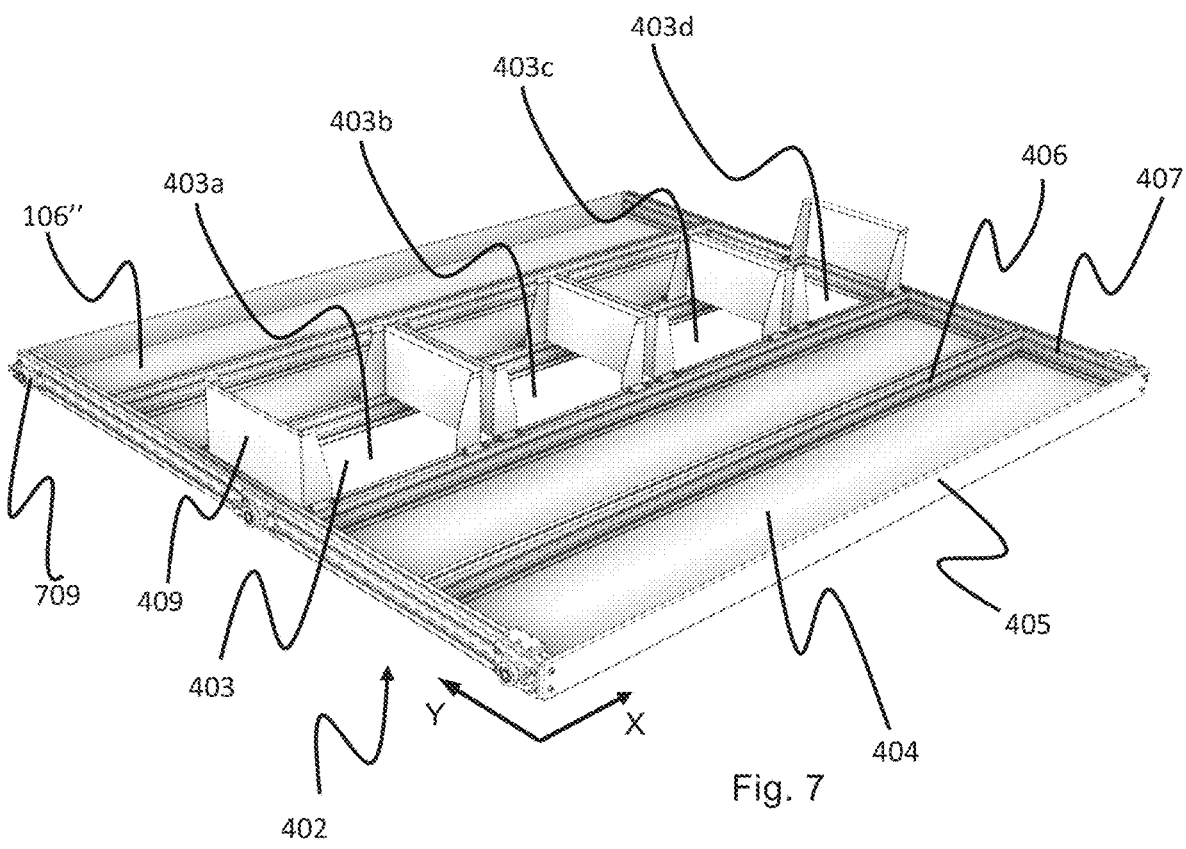
FIG. 7 is a perspective view of a container support configured as a matrix of container spaces (when the storage containers are not present) with a plurality of columns of container spaces arranged in the first horizontal direction and a plurality of rows of container spaces arranged in the second horizontal direction.
Figure 8:
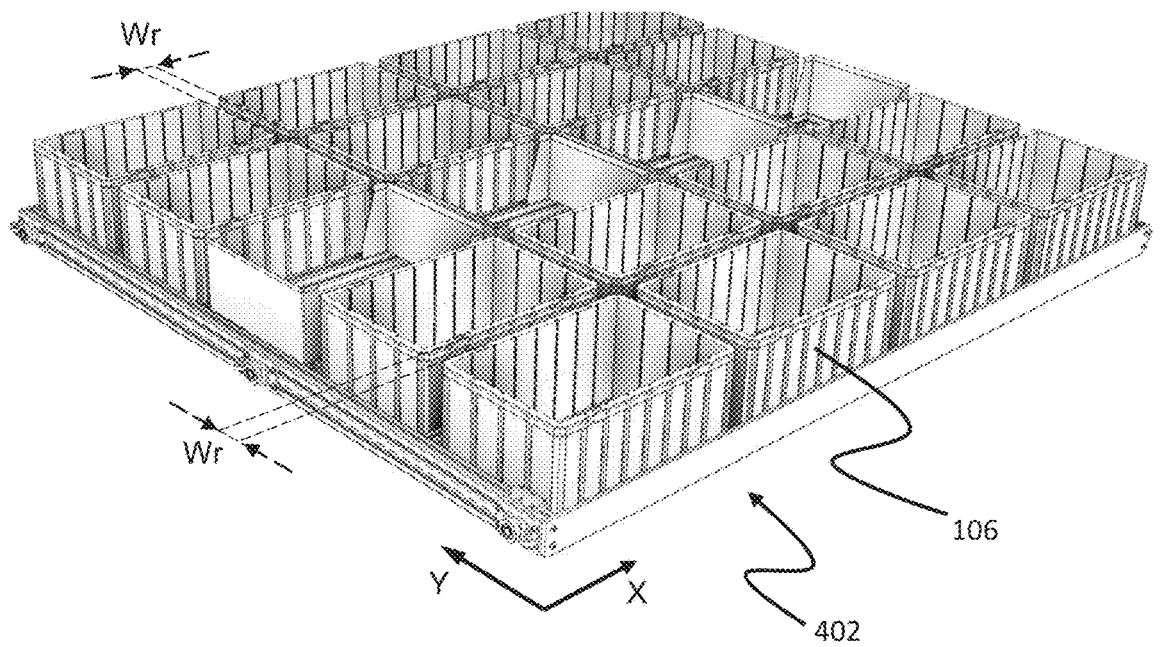
FIG. 8 is a perspective view of a container support configured as a matrix of container spaces with a plurality of columns of container spaces arranged in the first horizontal direction and a plurality of rows of container spaces arranged in the second horizontal direction, where storage containers are positioned in the container spaces.

FIG. 7 and FIG. 8 show an example of such a container support design. FIG. 7 shows a container support 402 without storage containers 106 and FIG. 8 shows the same container support 402 where storage containers 106 are positioned in the container spaces.

The container support 402 has principal directions in a first direction X and an orthogonal second direction Y. The container support 402 is configured as a horizontal matrix of container spaces with a plurality of columns of container spaces arranged in the first horizontal direction X and a plurality of rows of container spaces arranged in the second horizontal direction Y. Each row of container spaces is configured to receive a plurality of storage containers 106 and typically further displays at least one opening 403 extending along the second direction Y. The opening 403 may have a horizontal extent along the first direction X substantially equal to the horizontal extent of the row along the first direction X. The container support 402 of the lowermost container supporting framework 401n typically does not display an opening 403. The at least one opening 403 of each row of container spaces typically has an opening size being at least a maximum horizontal cross section $A_f$ ($W_f * L_f$) of the storage containers 106 to be stored.

The container support 402 of FIG. 7 and FIG. 8 comprises a plurality of guide structures 409 for the openings 403. The guide structure 409 is fixed along the peripherals of each opening 403a-d in order to aid the storage container 106 to be guiding correctly through the opening 403a-d during lifting/lowering by the respective remotely operated vehicles 201;301;601.

The container support 402 may be a plate or a frame without inner structure. The container spaces typically have a horizontal extent being at least a maximum horizontal cross section $A_f$ ($W_f * L_f$) of the storage containers 106 to be stored. The matrix of container spaces could be an imaginary division primarily set by the size of the storage containers 106. The size of the matrix of container spaces is linked to the number of rows and columns of the matrix. A matrix comprising l rows and m columns may extend a distance along the first direction X substantially equal to $l*L_f$ and extend a distance along the second direction Y substantially equal to $m*W_f$. Alternatively, a matrix comprising l rows and m columns may extend a distance along the first direction X substantially equal to $l*W_f$ and extend a distance along the second direction Y substantially equal to $m*L_f$. If a rail system 108 is used, the storage containers 106 will be spaced apart at least corresponding to the width of the rail $W_r$. The spacing of the storage containers 106 will add to the size of the matrix of container spaces. The total contribution from this spacing depends on the number of containers 106 and thus the number of spacings. The total spacing width may be calculated as $(l-1)*W_r$ or $(m-1)*W_r$. If a transport system 601 (typically comprising a crane 602) is used, the storage containers 106 may be stored closer together as compared to the system with rails 108. Any spacing of the storage containers 106 should be added to the size of the matrix of container spaces also when a transport system 601 is used.

In the example of FIG. 7, the container support 402 has a matrix of container spaces comprising four rows and five columns. The horizontal extent of this matrix is a distance substantially equal to $4*L_f$ along the first direction X and a distance substantially equal to $5*W_f$ along the second direction Y. Any spacing of the storage containers 106 should be added to the size of the matrix of container spaces, as described above. The container support may have a central line of openings 403, e.g. four openings 403 along a column. Alternatively, one single opening 403 extending through all four rows. Alternatively, a combination of openings 403 extend through one, two or three rows. On both sides of the central opening 403 or line of openings 403, container spaces are provided in a 4×2 configuration. This may be construed as two columns each of four container spaces on either side of the opening(s) 403. Alternatively, this may be construed as four rows each of five container spaces wherein the central container space being the opening 403. Alternatively, this may be construed as four rows each of four container spaces with two container spaces on either side of the opening 403.

Figure 9:
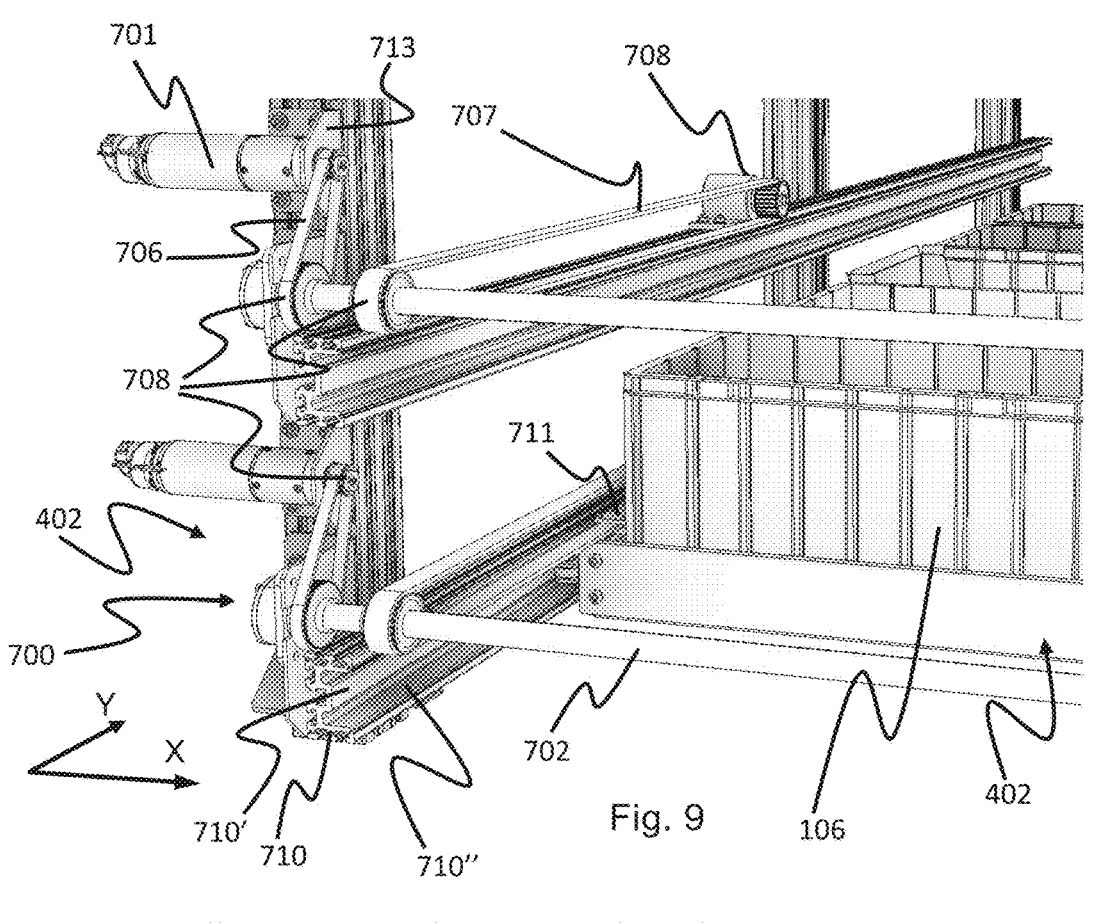
FIG. 9 is a perspective view of details of a container support and a container supporting framework, in particular of a support displacement device.

The opening 403, i.e. the perimeter of the at least one opening 403a-d in each row, of the first container supporting framework 401a and the at least one opening 403 of the at least one second container supporting framework 40b-n can be aligned vertically with respect to each other. This can be achieved by the at least one container support 402 of the at least one second container supporting framework 401b-n being displaceable along the second direction Y. The displacement may be achieved by the at least one second container supporting framework 401*b-n* comprising a support displacement device 700 configured to displace the displaceable container support 402 of the at least one second container supporting framework 401*b-n*. An example of such a support displacement device 700 is illustrated in FIG. 9 and further described below. Since all container spaces of the first container support 402*a*, i.e. the uppermost container support 402, are accessible through grid openings 415. The first container supporting framework 401*a*, i.e. the uppermost container supporting framework 401, does not need to be provided with a support displacing device 700, though efficiencies can be improved where it is provided with one.

The container support 402 of FIG. 7 and FIG. 8 comprise support plates 404 providing container spaces. In FIG. 8, storage containers 106 are placed on top of the support plates 404. One support plate 404 may provide four container spaces distributed along the first horizontal direction X forming a complete column. Alternatively, each column may comprise a plurality of support plates 404, e.g. one support plate 404 per container space. As a further alternative, one support plate 404 may provide two or more container spaces distributed along the second horizontal direction Y forming at least a part of a row. One support plate 404 may also provide a plurality of container spaces distributed along both the first direction X and the second direction Y.

Each container support 402 comprises a first container support beam 406 extending in the first horizontal direction X and a second container support beam 407 extending in the second horizontal direction Y. The first and second support beams 406,407 may be used to provide stiffness and stabilize the container support 402 in the horizontal plane $P_{rs}$. The first support beams 406 may extend the full length of a column. The second support beams 407 may extend the full length of a row.

In FIG. 7-8, a first support beam 406 is arranged between each column of container spaces, in total four first beams 406. The first support beams 406 may be used for attachment of the guide structures 409. The first support beams 406 may also be used for attachment of the support plates 404. The first support beams 406 may protrude upwards relative to the support plates 404, thereby preventing storage containers 106 from moving along the second horizontal direction Y relative to the container support 402. The first support beams 406 may also be used to support storage containers 106 and thus provide container spaces, i.e. a container space without a support plate 404.

In FIG. 7-8, two second support beams 407 are arranged in parallel with the rows. In this example the second support beams 407 are arranged not to divide the rows, i.e. on the edges of the container support 402. Second support beams 407 may additionally be arranged to divide the rows. The second support beams 407 may be used for attachment of the guide structures 409. The second support beams 407 may also be used for attachment of the support plates 404. The second support beams 407 may protrude upwards relative to the support plates 404, thereby preventing storage containers 106 from moving in the first direction X relative to the container support 402. The second support beams 407 may also be used to support storage containers 106 and thus provide container spaces, i.e. a container space without a support plate 404. Alternatively, the first and second support beams 406,407 may together provide container spaces. The second support beams 407 may also be used for attachment of shelf guides 709. The second support beams 407 may also be used for attachment of horizontal movement shelf rollers 709'. The shelf rollers 709,709' are further described below with reference to FIG. 10. The second support beams 407 may also be used for attachment of vertical pillars 431. These are inter alia illustrated in FIG. 11.

Each container support 402 may comprise a stabilization rib 405 arranged in the first direction X. In FIG. 7-8, two stabilization ribs 405 are arranged not to divide the columns, i.e. on the edges of the container support 402. The stabilization ribs 405 may additionally be arranged to divide the columns. The stabilization ribs 405 may be used for attachment of the guide structures 409. The stabilization ribs 405 may also be used for attachment of the support plates 404. The stabilization ribs 405 may have a vertical extent higher than the support plate 404. The stabilization ribs 405 may be used for stabilizing storage containers 106. The stabilization ribs 405 may also stabilize the container support by stiffening the structure to prevent twisting, e.g., under uneven loading. Stabilization ribs 405 may also be arranged in the second direction Y. The stabilization rib 405 may replace one or more first support beams 406, and vice versa. The stabilization rib 405 may replace one or more second support beams 407, and vice versa.

The first support beam 406, the second support beam 407 the stabilization rib 405, the support plate 404, the guide structure 409 and any other components associated with the container support 402 may be connected to each other by means of fasteners, welding, snap lock systems, tongue and groove system or other known methods know to those skilled in the art.

Figure 10:
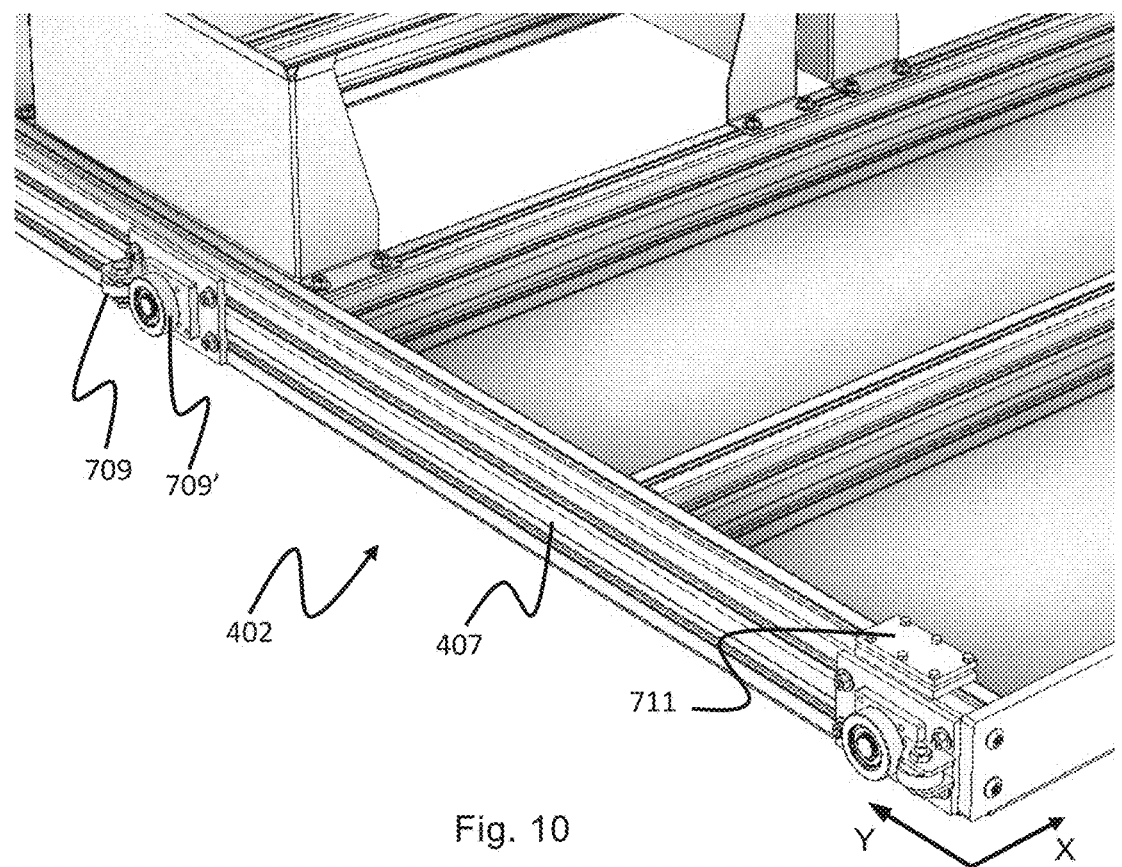
FIG. 10 is a perspective view of details of the container support, in particular of shelf rollers.

FIG. 9 and FIG. 10 shows that a container support 402 of one or more container supporting frameworks 401 may be made displaceable along the second horizontal direction Y relative to the container supporting framework 401. To displace the displaceable container support 402 along the second horizontal direction Y, the container supporting framework 401 of FIG. 9 comprises a support displacement device 700. Alternatively, the container support 402 may comprise the support displacement device 700. The support displacement device 700 is configured to displace the displaceable container support 402 relative to the container supporting framework 401.

To be displaceable along the second horizontal direction Y, the container support 402 and the corresponding container supporting framework 401 comprises a guide track 710 and a plurality of shelf rollers 709,709'. The shelf rollers 709, 709' are configured to travel along the guide track 710. The guide track 710 may be provided on the container supporting framework 401 and the shelf rollers 709,709' may be provided on the container support 402 as illustrated in FIG. 9 and FIG. 10, or vice versa.

The guide track 710 of FIG. 9 is an extruded profile. This guide track 710 comprises a horizontal part 710" and a vertical part 710'. When the guide track 710 is arranged with a longitudinal direction extending along the second horizontal direction Y, the horizontal part 710" is horizontally extending and the vertical part 710' is vertically extending.

The rollers 709,709' of FIG. 10 are provided in pairs comprising a shelf guide 709 and a horizontal movement shelf roller 709'. The shelf guide 709 has a vertically oriented axis of rotation. The horizontal movement shelf roller 709' has an axis of rotation oriented along the first horizontal direction X. As illustrated in FIG. 7, three pairs of rollers 709,709' can be arranged along the side of the container support 402 to cooperate with the corresponding guide track 710. The pairs of rollers 709,709' are distributed with one pair in the centre and one pair at each distal end of the edge of the container support 402. One container support 402 will typically have rollers 709,709' arranged at two opposing edges.

FIG. 9 shows how the horizontal movement shelf rollers 709' cooperate with the guide track horizontal part 710", in that the horizontal movement shelf rollers 709' can roll along the guide track horizontal part 710". The cooperation of the guiding track horizontal part 710" and the horizontal movement shelf rollers 709' allow the relative displacement between the container support 402 and the container supporting framework 401.

FIG. 9 shows how the shelf guides 709 cooperate with the guide track horizontal part 710, in that the vertical movement shelf rollers 709' can roll along the guide track vertical part 710". The cooperation of the guiding track vertical part 710' and the shelf guides 709 control the direction of the relative movement between the container support 402 and the container supporting framework 401.

FIG. 9 shows an example of a support displacement device 700. This support displacement device 700 comprises an electric motor 701. The electric motor 701 is arranged on the container supporting framework 401 by means of a bracket 713. The bracket can e.g. be connected to a vertical pillar 431. For maintenance purposes, the components of the support displacement device 700 are preferably arranged in positions easily accessible for technicians. In particular the electric motors 701 or alternative drive devices should preferably be arranged on the edge of the container supporting framework 401 and extending on the outside of the container supporting framework 401. Preferably also close to a corner of the container supporting framework 401. By arranging the electric motors 701 of adjoining container supporting frameworks 401 on opposite sides of the container supporting frameworks 401, more space is made available for the technicians to install or perform maintenance on the electric motor 701 and/or the support displacement device 700.

The support displacement device 700 comprises a drive shaft 702 configured to be driven by the electric motor 701. The drive shaft 702 is also configured to drive, i.e. displace, the displaceable container support 402.

Figure 11:
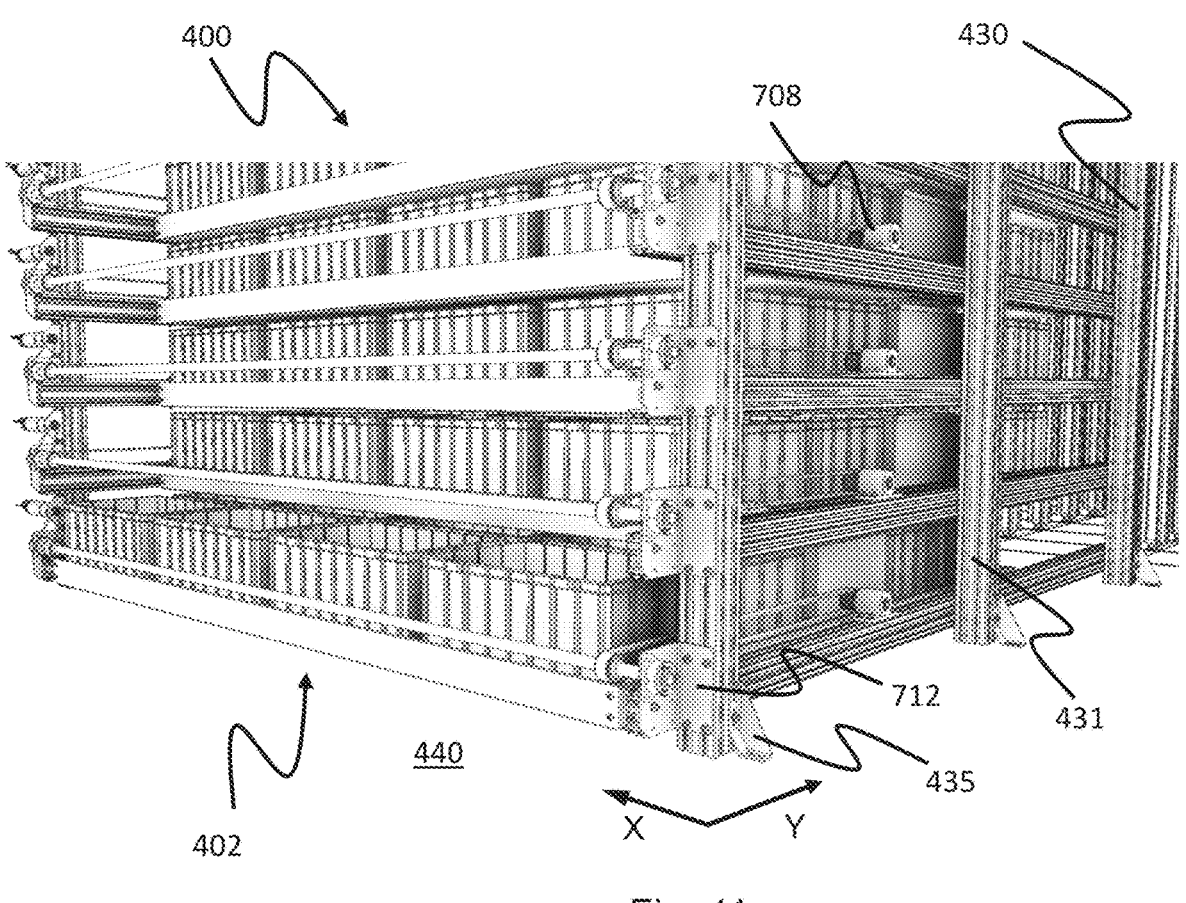
FIG. 11 is a perspective view of further details of the container support and the container supporting framework, in particular of a support displacement device, where a lowermost container support is displaced relative to the above container supports.

FIG. 9 and FIG. 11 show how the drive shaft 702 can be arranged on the container supporting framework 401. The drive shaft 702 is arranged on the container supporting framework 401 by means of brackets 712. These brackets 712 can be arranged on the vertical pillars 431. These brackets 712 are typically arranged at the distal ends of the drive shaft 702. The brackets 712 must allow rotation of the drive shaft 702. The drive shaft 712 is arranged substantially level and extends along the first direction X.

In FIG. 9 and FIG. 11, rotation of the electric motor 701 causes rotation of the drive shaft 702 by means of a belt wheel 708 arranged on the electric motor 701, a belt wheel 708 arranged on the drive shaft 702, and a first belt 706 connecting these belt wheels 708. The belt wheel 708 arranged on the drive shaft 702 is arranged on the distal end of the drive shaft 702 to align with the belt wheel 708 arranged on the electric motor 701. In FIG. 9 and FIG. 11, each drive shaft 702 is driven by one electric motor 701. This is advantageous since it requires fewer parts and the movements along each side are synchronised by the drive shaft 702 which is common to both sides. Alternatively, two electric motors 701 can be provided for each drive shaft 702, connected to opposite ends of the drive shaft 702 or drive shaft portions.

In FIG. 9 and FIG. 11, rotation of the drive shaft 702 causes displacement of the displaceable container support 402 by means of two belt wheels 708 arranged on the drive shaft 702, two belt wheels 708 arranged on the container supporting framework 401, two brackets 711 arranged on the container support 402, and two second belt 707.

The two belt wheels 708 arranged on the drive shaft 702 and configured to drive the container support 402 are concentric with each other and concentric with the belt wheel 708 arranged on the drive shaft and configured to cooperate with the electric motor 701.

The two belt wheels 708 arranged on the container supporting framework 401 are provided on opposite sides of the container supporting framework 401 and connected e.g. to the guiding tracks 710 or the vertical pillars 431. The belt wheels 708 arranged on the container supporting framework 401 are aligned with the belt wheels 708 arranged on the drive shaft 702.

The two second belts 707 each connect one belt wheel 708 arranged on the drive shaft 702 with one belt wheel 708 arranged on the container supporting framework 401. When connected, the second belts 707 extend along the second horizontal direction Y. The second belts 707 then extend in the same direction as the intended displacement of the container support 402. The extension of the second belts 707 along the second horizontal direction Y should substantially corresponding to or exceed the predetermined distance of displacement of the container support 402.

The two second belts 707 are arranged with a distance between them in the first direction X exceeding the horizontal extension of the container support 402 along the first direction X.

The two brackets 711 are arranged on opposite sides of the container support 402 and facing respective second belts 707. Each bracket 711 is aligned with and connected to respective second belts 707. The bracket 711 and the second belt 707 can be clamped by means of a plate bolted to the bracket 711 and the second belt being arranged between them. In this way the bracket can be connected to any given part of the second belt 707.

The direction of displacement of the container support 402 depends on the direction of rotation of the drive shaft 702 and thus the direction of rotation of the electric motor 701. By providing a clockwise rotation from the electric motor 701, the container support 402 will be displaced in an opposite direction as compared to when a counter-clockwise rotation is provided from the electric motor 701. The displacement-rotation ration between the container support 402 and the drive shaft 702 or the electric motor 701 can be configured by selecting the size of the belt wheels 708.

FIG. 11 is a perspective view of a lowermost part of the storage tower 400. The lowermost container support 402*n*, i.e. one of the second container supports 402*b-n*, are displaced relative to the above container supports 402. The displaced container support 402 is displaced a distance in the second direction Y corresponding to one grid cell 422.

Figure 18A:
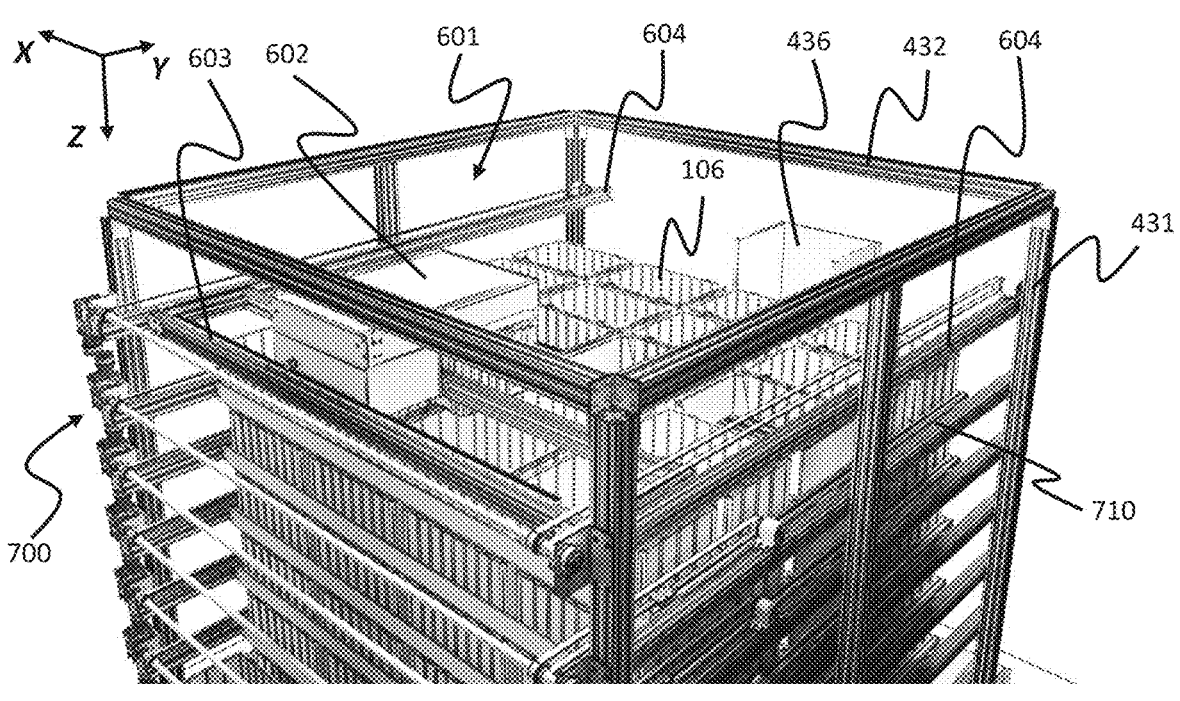
FIG. 18A and FIG. 18B are different perspective views showing details of the storage system of FIGS. 16A-B and 17A-B, in particular of the transport mechanism.
Figure 18B:
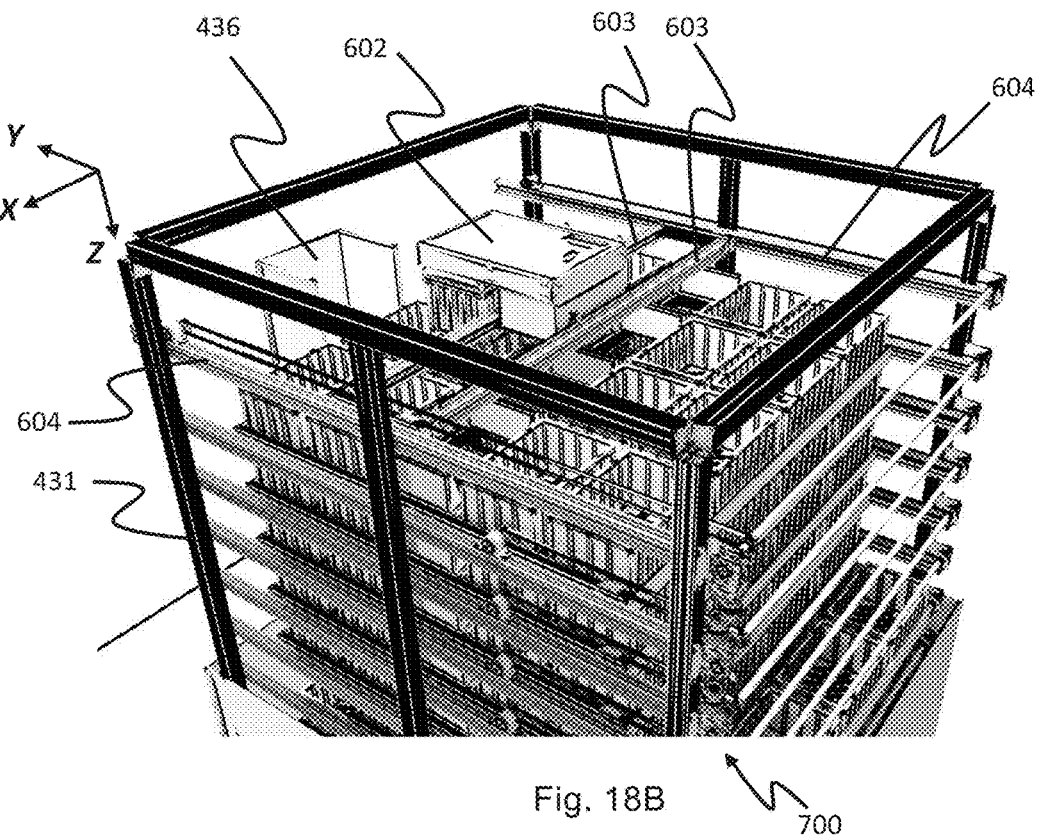

In FIG. 11 it is shown that the storage tower 400 comprises a plurality of vertical pillars 431. These vertical pillars 431 are typically supported by a floor 440, and possibly also connected to the floor 440 by means of pillar brackets 435. The plurality of vertical pillars 431 are configured to support a plurality of guide tracks 710. If the storage tower 400 comprises a rail system 408, the plurality of vertical pillars 431 can be configured to support the rail system 408. The vertical pillars 431 are distributed with distances along the first direction X and/or the second direction Y that are larger than the distances between the upright members 102 of the prior art framework structure 100. This is because the container supports 402 have a larger span than the storage columns 105 of the prior art framework structure 100. Therefore, each vertical pillar 431 should be configured to withstand greater loads than the upright members 102 since there are fewer of them. If the storage tower 400 comprises a transport system 601, the plurality of vertical pillars 431 can be configured to support the transport system 601. This is illustrated in FIGS. 18A and 18B.

Figure 12:
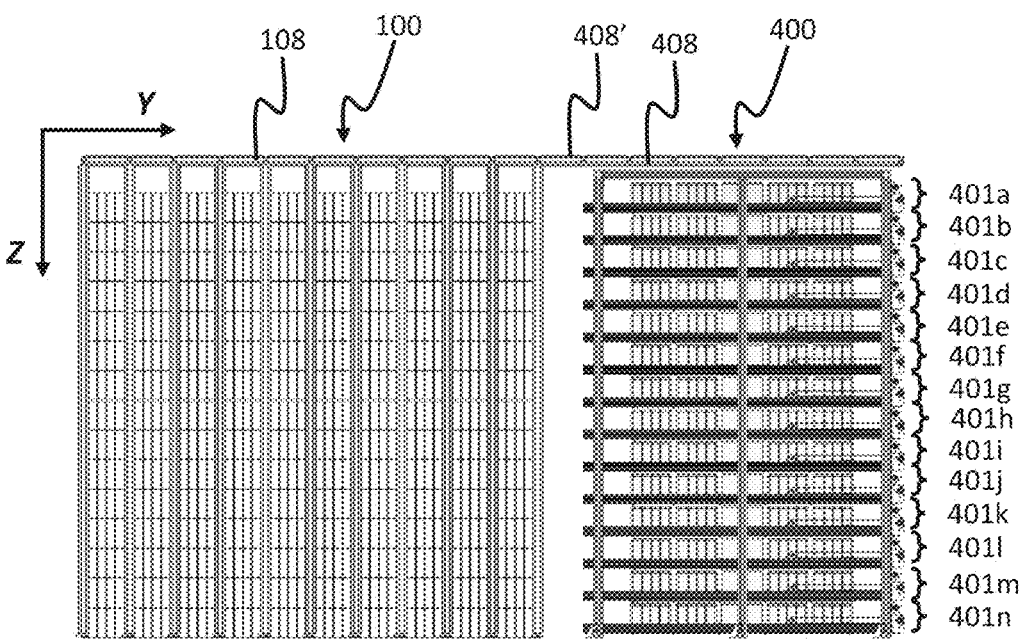
FIG. 12 is a side view of a storage system in accordance with an embodiment of the invention, where a storage grid and a storage tower are positioned side by side and below a rail system.

FIG. 12 shows a side view of a storage and retrieval system 1 with one inventive storage tower 400 and one prior art storage grid 100. The above-mentioned support displacement devices 700 are shown arranged at the end of each container support 402. This particular configuration comprises fourteen container supporting frameworks 401a-n arranged beneath a rail system 408, each with one container support 402 displaceable in the Y direction. Other numbers of container supporting frameworks could be present as appropriate. Preferably there are more than five container supporting frameworks, more preferably more than ten. In order to enable movement between the storage grid 100 and the storage tower 400, a coupling rail system 408' is seen interconnecting the rail system 108 of the prior art storage grid 100 and the rail system 408 of the inventive storage tower 400. The rail system 408 of the inventive storage tower 400 and the rail system 108 of the prior art storage grid 100 have a mutual orientation and design such that the same type of vehicles 301 may operate on both rail systems 108,408. Due to the different construction of the container supporting frameworks 401 for the inventive storage tower 400 and the stacks 107 of storage containers 106 for the prior art storage grid 100, the rails 410,411 above the container supporting frameworks 401 can with advantage be made wider compared to the rails 110,111 above the stacks 107, at least in one of the X-Y directions.

Figure 13:
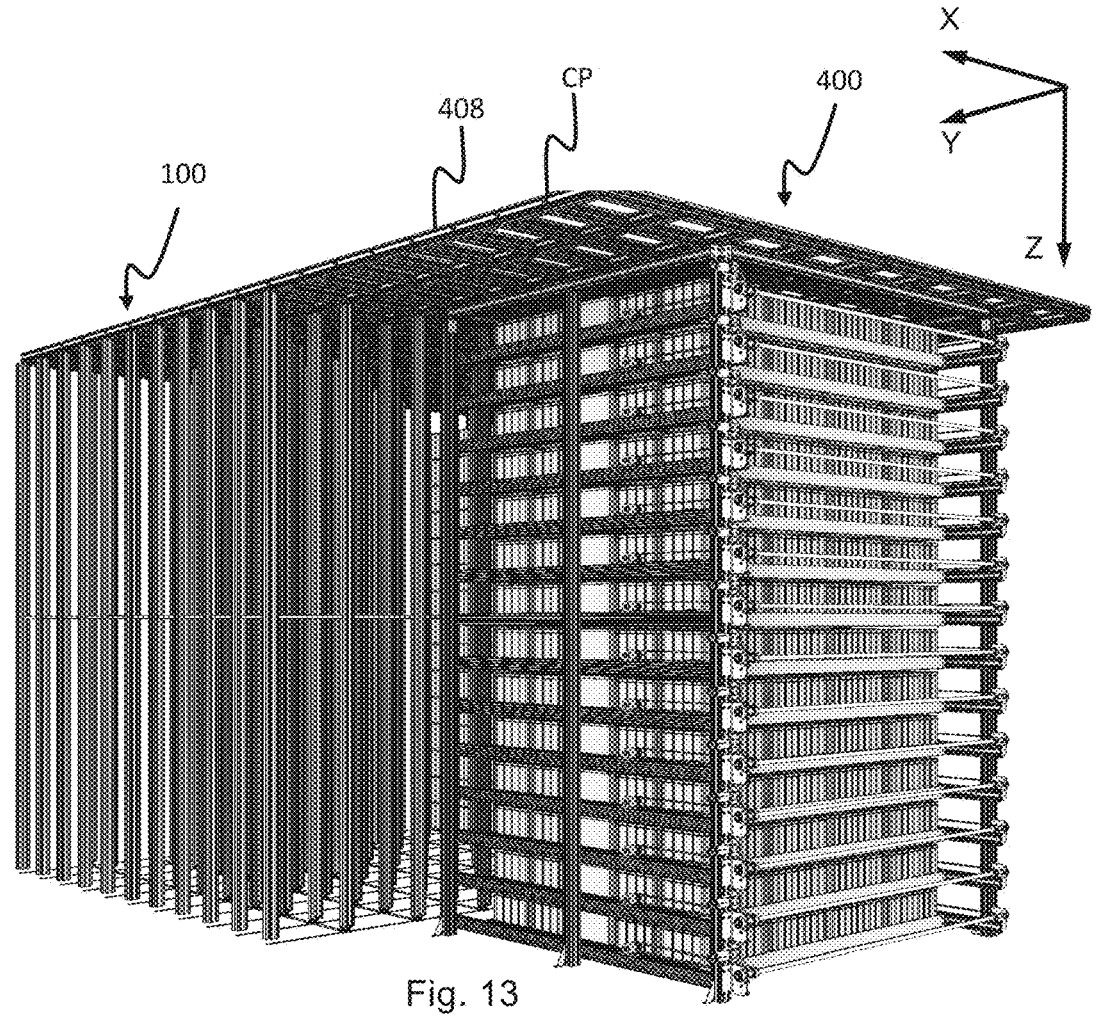
FIG. 13 is a perspective view of the storage system of FIG. 12, where a storage grid and a storage tower are positioned side by side.

FIG. 13 shows a perspective view of the same storage and retrieval system 1 as FIG. 12.

Both the inventive storage tower 400 and the prior art storage grid 100 can be of any size. In particular it is understood that the storage tower 400 and/or the storage grid 100 can be considerably wider and/or longer and/or deeper than disclosed in the accompanied figures. For example, storage tower 400 and/or the storage grid 100 may have a horizontal extent having space for more than 700×700 storage containers 106 and a storage depth of more than fourteen storage containers 106.

One way of installing the storage tower 400 as described above can be to remove all stacks 107 of storage containers 106 beneath a rail system 108 part of a prior art storage and retrieval system 1 as shown in FIG. 1, leaving a cantilever part CP of the rail system 108. Then inserting one or more inventive storage towers 400 within the empty volume below the cantilever part CP of the rail system 108.

Figures 14, 15A:
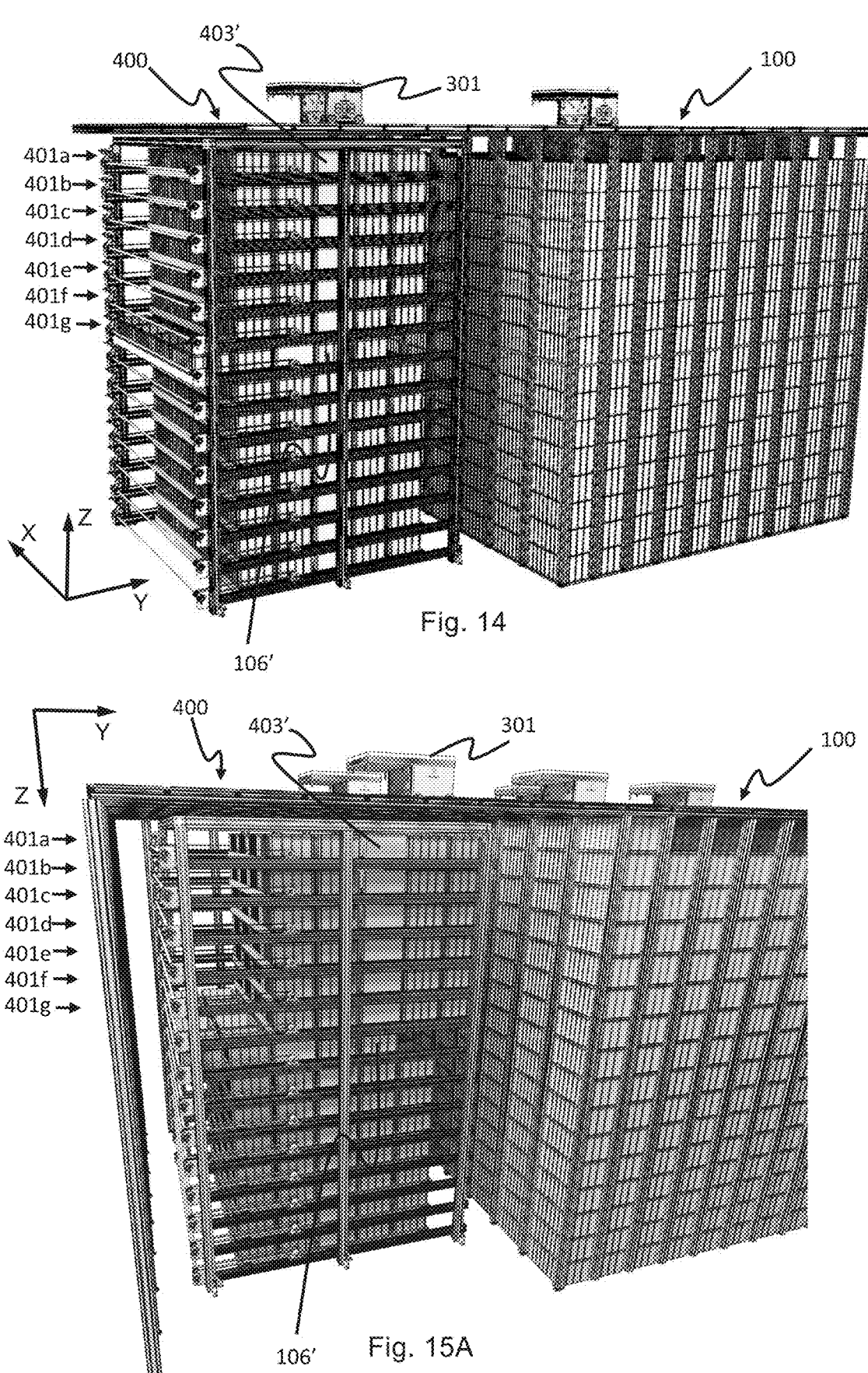
FIG. 14 is a perspective view of the storage system of FIG. 12, where a storage grid and a storage tower are positioned side by side, where one container support is displaced.
FIG. 15A is a perspective view of the storage system of FIG. 12, where a storage grid and a storage tower are positioned side by side, where a plurality of container supports are displaced in opposite directions.
Figure 15B:
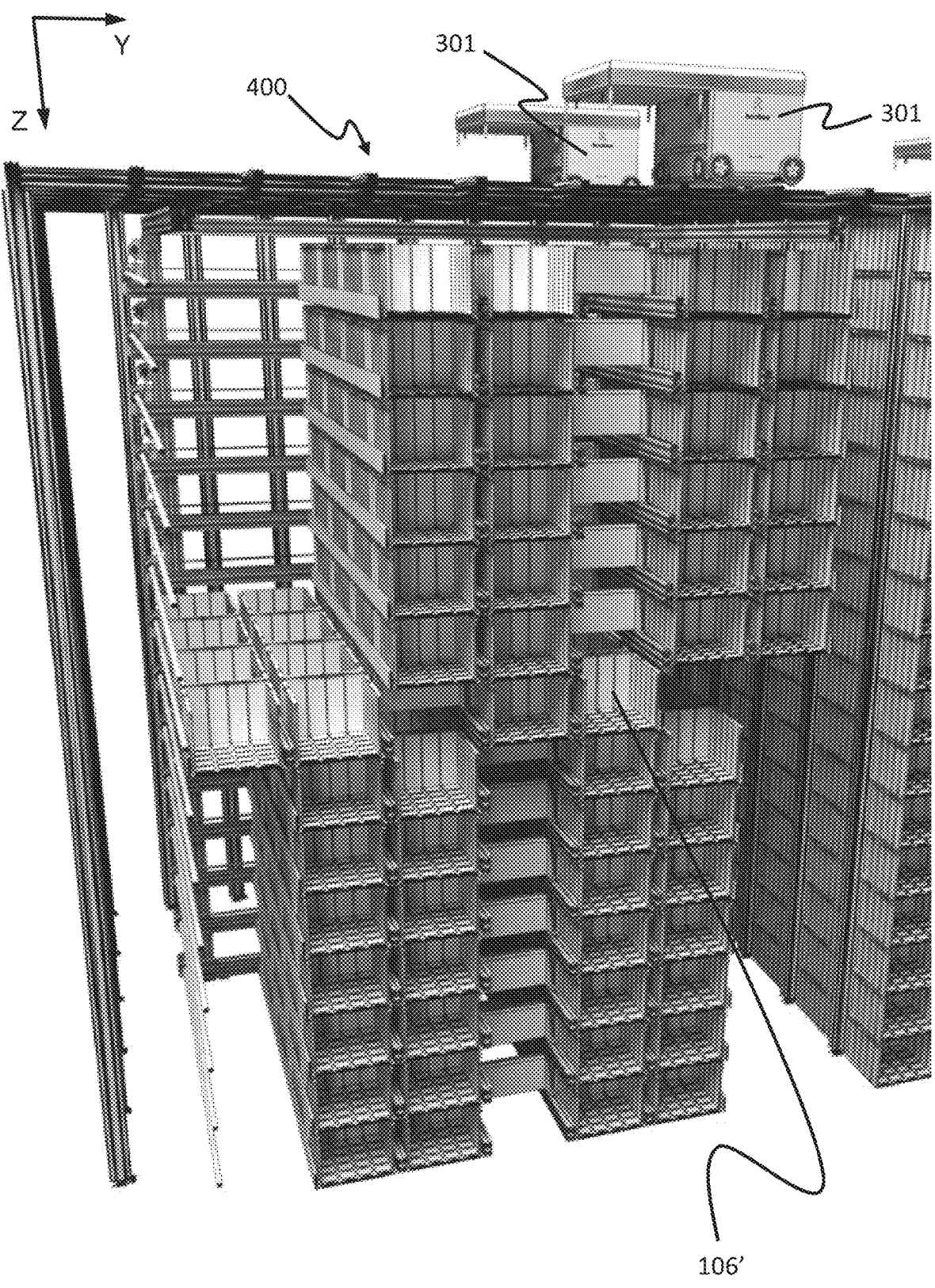
FIG. 15B is a cross-section of the storage system in accordance with FIG. 15A.

FIGS. 14 and 15A are perspective views of a storage system 1 comprising the storage tower 400 during operation. FIG. 15B shows a vertical cross-section of the storage system 1 of FIG. 15A.

In order to store and retrieve a target storage container 106' using the storage tower 400, the following operations are performed (with reference to FIG. 14):

The control system 500 gives instructions to the vehicle 301 to pick up a target storage container 106' with coordinates X,Y,Z. This position corresponds to a storage container 106 positioned in a container space of a container support 402 forming part of a horizontal container supporting framework 401g at a depth of $5 \times \Delta dV + Vr1$ below the rail system 408. Since all the openings 403 in the storage tower 400 are initially aligned (with same X-Y coordinates), the X-Y position of the target opening 403' of the container supporting framework 401a adjacent the rail system 408 is equal to the X-Y positions of the target openings 403' of the underlying container supporting frameworks 401b-n.

The vehicle 301 moves by aid of its drive means 301b,c in the X and Y directions until its lifting device 304 is located directly above the target opening 403' situated in the row of storage containers in which the target storage container 106' is positioned.

During and/or after movement of the vehicle 301 to the position above the target opening 403', the control system 500 sends an instruction to the support displacement device 700 to displace the container support 402 of the container supporting framework 401g a sufficient distance in the second direction Y so that the target storage container 106' is vertically aligned with the target openings 403' of the above situated container supporting frameworks 401a-f.

During and/or after the displacement of the container support 402, the lifting device 304 of the vehicle 301 is activated and lowered down through the grip opening 415 and the aligned target openings 403' until the gripping part of the lifting device 304 is in position to grip the target storage container 106'.

After the target storage container 106' has been gripped by the lifting device 304 and lifted above the above situated container supporting framework 401f, the support displacement device 700 is again activated in order to move the container support 402 back to its initial Y position.

When the target storage container 106' has been lifted above the rail system 408, the vehicle 301 is moved to another location on the rail system 408, for example to a dedicated port column/chute 436 for delivery to an access station 437.

The process has the advantage that the need for digging performed for prior art storage and retrieval system is no longer necessary.

In the operational example of FIG. 14 the target storage container 106' is positioned next to the opening 403 of the same row of container spaces. Some rows of container spaces may comprise more than one container space on either side of the opening 403. If a target storage container 106' is not positioned next to the opening 403, i.e. there is a container space between the target storage container 106' and the opening 403, the container support 402 must be displaced a distance along the second horizontal direction Y corresponding to two grid cells 422 to position the target storage container 106' in vertically aligned with the target openings 403' of the above situated container supporting frameworks 401a-f. From the initial position of the container support 402, there may not be sufficient space in the storage tower 400 for the container support 402 to be displaced a distance corresponding to two grid cells 422 both directions along the second direction Y. In that case the target storage container 106' can be retrieved as illustrated in FIG. 15A by displacing all of the container supports above a distance of one grid cell in the other direction.

The retrieval operation of FIG. 15A is similar to the operation described with reference to FIG. 14. However, an additional step is performed.

During movement of the vehicle 301 to the position above the target openings 403', the control system 500 sends an instruction to the support displacement devices 700 to displace the container supports 402 of the container supporting frameworks 401a-f situated above the target storage container 106' a sufficient distance in the second horizontal direction Y so that the target storage container 106' is vertically aligned with the target openings 403' of the above situated container support-
ing frameworks 401a-f. The container supports 402 of
the container supporting frameworks 401a-f situated
above the target storage container 106' are displaced
along the second horizontal direction Y a distance
corresponding to one grid cell 422 and opposite the
displacement of the container support 402 of the target
storage container 106'.

FIG. 15B shows a cross-section of the storage system 1 in
accordance with FIG. 15A. Here two vehicles 301 are
simultaneously retrieving respective target containers 106'
positioned on the same container support 402. If the control
system 500 detects two target storage containers 106' posi-
tioned on the same container support 402, and in particular
when positioned in the same column of container spaces, the
control system 500 may give instructions to two vehicles
301 to pick up these target storage containers 106' simulta-
neously.

Figures 16A, 16B:
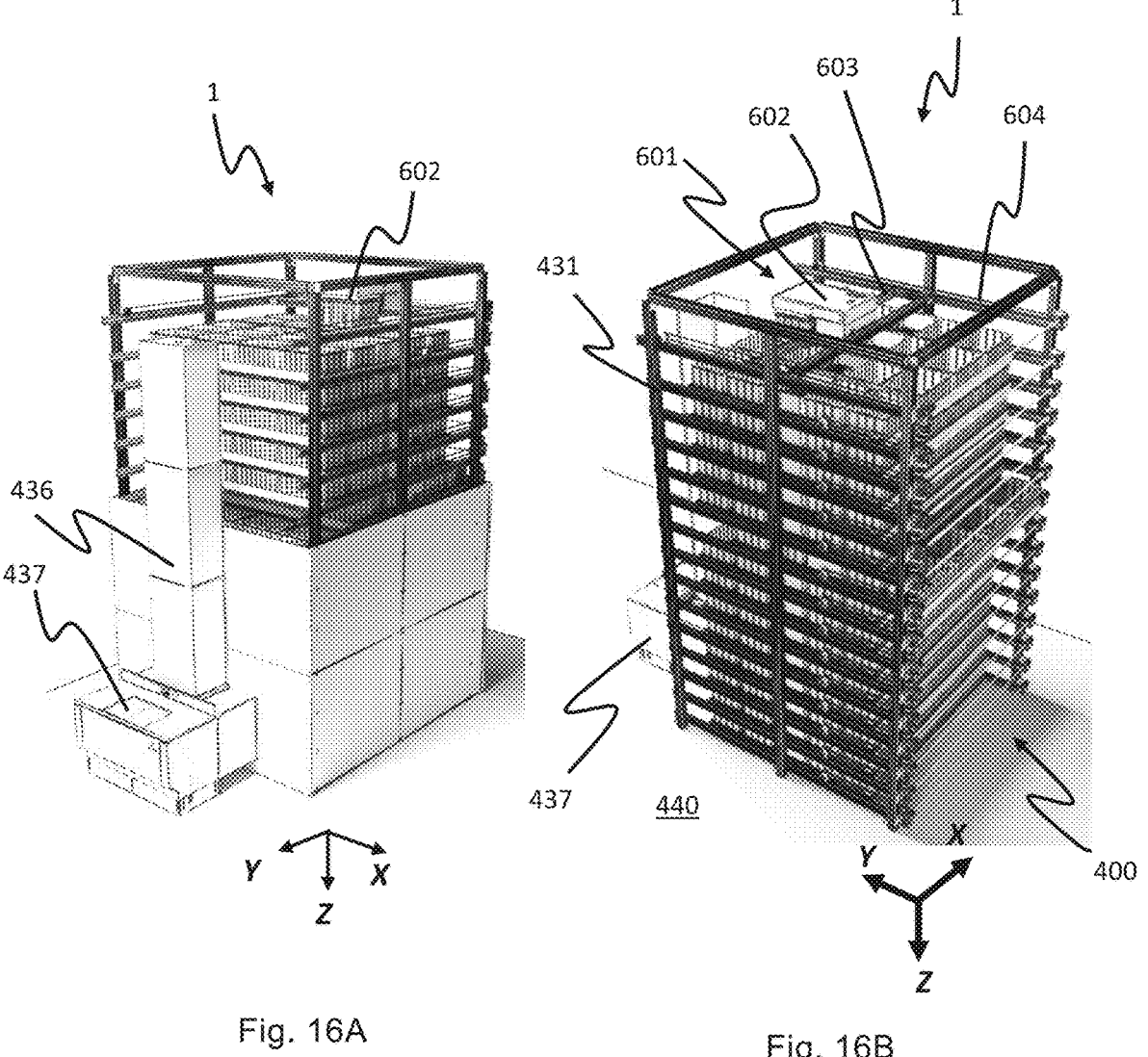
FIG. 16A and FIG. 16B are different perspective views of another embodiment of the storage system according to the invention, where a storage tower is positioned below a transport system.
Figure 17:
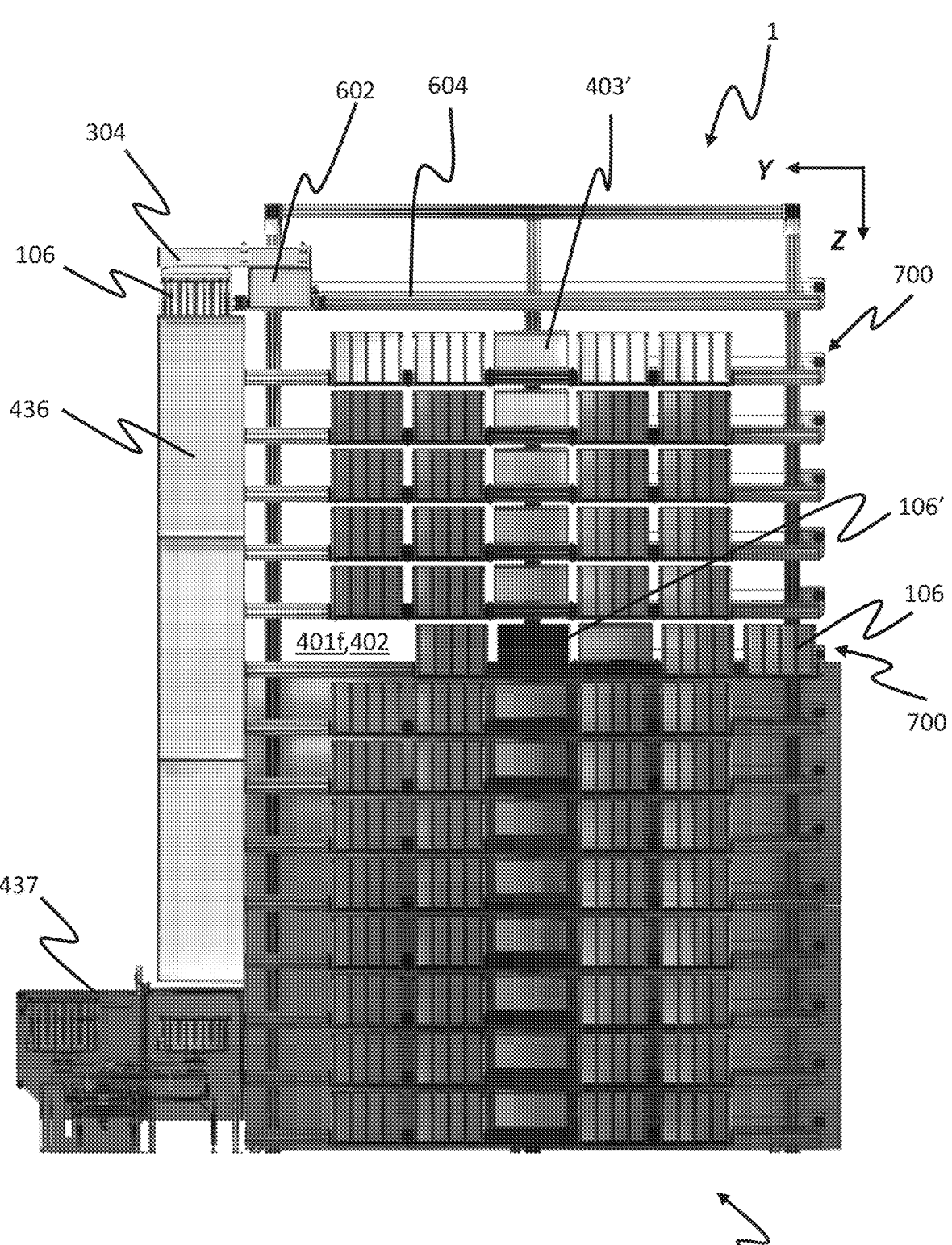
FIG. 17 is a side view of the storage system of FIG. 16A.

FIGS. 16A-B, FIG. 17 and FIGS. 18A-B show storage
and retrieval system 1 comprising one storage tower 400.
Instead of a vehicle 201,301 with wheels moving on a rail
system 408, the storage and retrieval system 1 comprises a
transport system 601. The transport system 601 comprises a
crane 602 moveable in the first direction X on a sliding bar
603 extending across the width of the storage tower 400.
Movements in the second direction Y is achieved by sliding
the sliding bar 603 along two fixed bars 604 extending in the
second direction Y on both sides of the storage tower 400.
In FIGS. 16-18, the crane 602 is shown as a container
handling vehicle with a cantilever construction supported on
two parallel sliding bars 603.

When the transport system 601 receives an instruction
from the control system 500 to retrieve a target storage
container 106' stored in for example the sixth container
supporting framework 401f counted from above (as shown
in FIG. 17), the support displacement device 700 displaces
the container support 402 in the Y direction until the target
storage container 106' is vertically aligned with the target
opening 403' vertically aligned within the above situated five
container supporting frameworks 401a-e. Before, during or
after the displacement of the container support 402, the
crane 602 of the transport system 601 is moved by use of the
sliding bar 603 and the fixed bar 604 to a location in which
the lifting device 304 is vertically aligned above the target
opening 403' of the first container supporting framework
401a (and due to the initial alignment, also the correspond-
ing openings 403 of the container supporting frameworks
401b-e down to at least to the container supporting frame-
work 401f with the target storage container 106').

The storage tower 400 shown in FIGS. 16A-18B also
comprise a dedicated port column or chute 436 into which
the target storage container 106' can be lowered/raised by
use of the lifting device 403 of the crane 602. In FIGS.
16A-B and FIG. 17, an access station 437 is shown arranged
below the lower end of the chute 436 to receive and to
provide storage containers 106 to be retrieved and stored,
respectively.

The operations described with reference to FIGS. 14 and
15A-B applies mutatis mutandis to a storage tower 400
comprising a transport system 601.

FIG. 18A-B show that the storage tower 400 can comprise
horizontal beams 432 for connection to the top of the vertical
pillars 431.

In the preceding description, various aspects of the auto-
mated storage and retrieval system and associated method of
picking product items using vehicles have been described
with reference to the illustrative embodiment. For purposes of explanation, specific numbers, systems and configura-
tions were set forth in order to provide a thorough under-
standing of the system and its workings. However, this
description is not intended to be construed in a limiting
sense. Various modifications and variations of the illustra-
tive embodiment, as well as other embodiments of the
system, which are apparent to persons skilled in the art to
which the disclosed subject matter pertains, are deemed to
lie within the scope of the present invention.

Figures 19A, 19B, 19C:
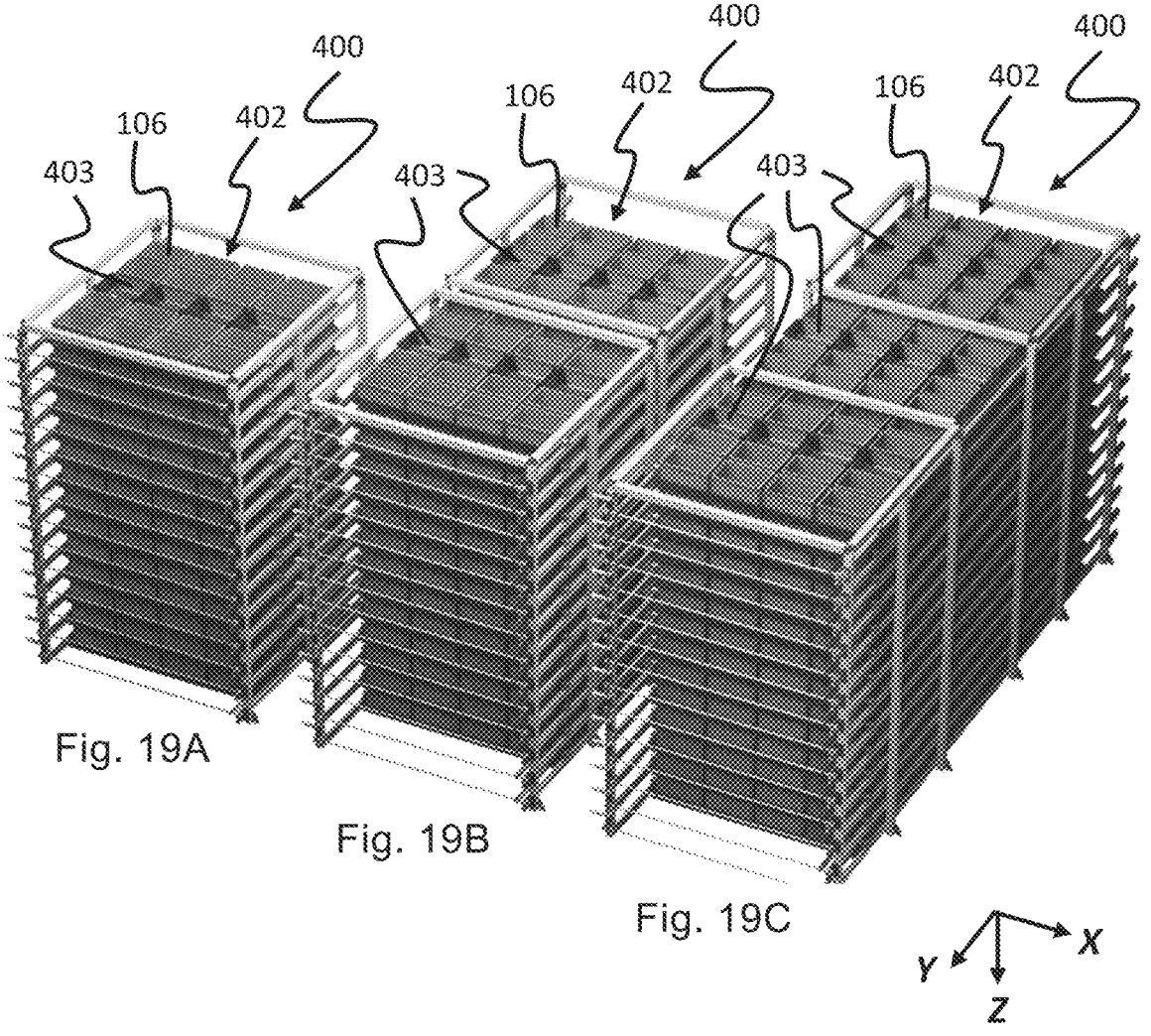
FIG. 19*a-c* are perspective views of three storage towers, each with a different configuration of the container supporting frameworks and the container supports.

FIGS. 19a-c shows three different storage towers 400.

The storage tower 400 in FIG. 19a has container supports
402 with a matrix of container spaces comprising four rows
and five columns, i.e. a 4×5 matrix. The four rows of
container spaces are symmetric. Each row is configured to
receiving four storage containers 106 and comprises one
opening 403.

The storage tower 400 in FIG. 19b has container supports
402 with a matrix of container spaces comprising four rows
and ten columns, i.e. a 4×10 matrix. The four rows of
container spaces are symmetric. Each row is configured to
receiving eight storage containers 106 and comprises two
openings 403. One container support 402 of the storage
tower 400 of FIG. 19b is equal to two container supports 402
of the storage tower 400 of FIG. 19a placed side by side
along the second direction Y.

The storage tower 400 in FIG. 19c has container supports
402 with a matrix of container spaces comprising four rows
and fifteen columns, i.e. a 4×15 matrix. The four rows of
container spaces are symmetric. Each row is configured to
receiving twelve storage containers 106 and comprises three
openings 403. One container support 402 of the storage
tower 400 in FIG. 19c is equal to three container supports
402 of the storage tower 400 of FIG. 19a placed side by side
along the second direction Y.

In FIGS. 19b and 19c each row of container spaces
displays a plurality of openings 403 distributed with an
offset corresponding to d+1 grid cells 422 in the second
direction Y, where d is an integer of 1 or more. In these
particular examples d=4.

LIST OF REFERENCE NUMBERS

| | |
|---|---|
| 1 | Storage and retrieval system |
| 80 | Product items |
| 100 | Framework structure/prior art storage grid |
| 102 | Upright members of framework structure |
| 103 | Horizontal members of framework structure |
| 105 | Storage column |
| 106 | Storage container |
| 106' | Particular position of a storage container/target storage container |
| 106" | Vacant container space for a storage container |
| 107 | Stack |
| 108 | Prior art rail system |
| 110 | Parallel rails in first direction (X) |
| 110a | First rail in first direction (X) |
| 110b | Second rail in first direction (X) |
| 111 | Parallel rail in second direction (Y) |
| 111a | First rail of second direction (Y) |
| 111b | Second rail of second direction (Y) |
| 115 | Grid opening |
| 119 | First port column |
| 120 | Second port column |
| 201 | Prior art storage container vehicle |
| 201a | Vehicle body of the storage container vehicle 101 |
| 201b | Drive means/wheel arrangement, first direction (X) |
| 201c | Drive means/wheel arrangement, second direction (Y) |
| 301 | Prior art cantilever storage container vehicle/remotely operated vehicle |

-continued

| | |
|---|---|
| 301a | Vehicle body of the vehicle 301 |
| 301b | Drive means in first direction (X) |
| 301c | Drive means in second direction (Y) |
| 304 | Lifting device |
| 400 | Storage tower |
| 401 | (Horizontally extending) container supporting framework |
| 401a | First container supporting framework |
| 401b-n | Second/underlying container supporting framework(s) |
| 402 | Container support |
| 403, 403a-d | Opening (in container support 402) |
| 403', 403a'-d' | Target opening |
| 404 | Support plate for storage container |
| 405 | Stabilization rib (for stabilizing storage containers) |
| 406 | First container support beam (oriented in the first direction X) |
| 407 | Second container support beam (oriented in the second direction Y) |
| 408 | Rail system |
| 408' | Coupling rail system |
| 409 | Guiding structure (for opening) |
| 410 | A first set of parallel rails |
| 411 | A second set of parallel rails |
| 415 | Grid opening |
| 422 | Grid cell |
| 431 | Vertical pillar |
| 432 | Horizontal beam (for connecting vertical pillars 431) |
| 435 | Pillar bracket (for vertical pillar 431) |
| 436 | Port column/chute |
| 437 | Access station |
| 440 | Floor |
| 500 | Control system |
| 601 | Transport system |
| 602 | Crane |
| 603 | Sliding bar |
| 604 | Fixed bar |
| 700 | Support displacement device |
| 701 | Electric motor |
| 702 | Drive shaft |
| 706 | First belt/chain |
| 707 | Second belt/chain |
| 708 | Belt wheel |
| 709 | Shelf guide |
| 709' | Horizontal movement shelf roller |
| 710 | Guiding tracks (configured to receive shelf rollers 709, 709') |
| 710' | Guiding track, vertical part |
| 710" | Guiding track, horizontal part |
| 711 | Bracket (for connection of the container support 402 to the second belt/chain 707) |
| 712 | Bracket (for drive shaft 702) |
| 713 | Bracket (for electric motor 701) |
| X | First direction |
| Y | Second direction |
| Z | Third direction |
| $P_{rs}$ | Horizontal plane |
| $W_f$ | Width of storage container |
| $L_f$ | Length of storage container |
| $H_f$ | Height of storage container |
| $A_f$ | Areal of storage container |
| Wr | Width of one rail |
| $V_{r1}$ | Offset between lower edge of rail system and lower edge of first container supporting framework |
| $\Delta$dV, $\Delta$dVb-n | Offsets between lower edge of container supporting framework below the first container supporting framework |
| CP | Cantilever part of the rail system (108) or traveling crane system (601) |

The invention claimed is:

1. A storage tower for storing storage containers, comprising a plurality of horizontally extending container supporting frameworks distributed with vertical offsets,
  wherein the plurality of container supporting frameworks comprises
  a first container supporting framework and
  at least one second container supporting framework arranged beneath and extending parallel to the first container supporting framework, wherein each of the first and the at least one second container supporting frameworks comprises
  a horizontally extending container support with principal directions in a first direction and an orthogonal second direction, each container support being configured as a matrix of container spaces with a plurality of columns of container spaces arranged in the first direction and a plurality of rows of container spaces arranged in the second direction,
  wherein each row of container spaces of the first container supporting framework
  is configured to receive a plurality of storage containers and
  displays at least one opening extending along the second direction, the at least one opening having an opening size being at least a maximum horizontal cross section of the storage containers to be stored,
  wherein the at least one opening of the first container supporting framework and the at least one opening of the at least one second container supporting framework can be aligned vertically with respect to each other,
  wherein at least one container support is displaceable along the second direction, and
  wherein at least one container supporting framework further comprises a support displacement device configured to displace the displaceable container support.

2. The storage tower according to claim 1,
  wherein each row of container spaces of the at least one second container supporting frameworks
  is configured to receive a plurality of storage containers and
  displays at least one opening extending along the second direction, the at least one opening having an opening size being at least a maximum horizontal cross section of the storage containers to be stored.

3. The storage tower according to claim 1,
  wherein the support displacement device comprises a linear actuator, a gearwheel drive, chain drive, a belt drive or any combination thereof.

4. The storage tower according to claim 3,
  wherein the support displacement device comprises a motor for driving the linear actuator, gearwheel drive, chain drive, belt drive or any combination thereof, the motor being arranged outside a horizontal extent of the respective container supporting framework containing at least one displaceable container support to be displaced, or
  wherein the displacement device is a direct drive mechanism arranged on the container support.

5. The storage tower according to claim 1,
  wherein each container support further comprises a plurality of horizontal movement shelf rollers rotationally arranged on at least one side of the container support extending along the second direction, the horizontal movement shelf rollers having a horizontal axis of rotation along the first direction, and
  wherein each of the plurality of container supporting frameworks further comprises a set of guiding tracks arranged on each side of the container supporting frameworks along the second direction, the set of guiding tracks being oriented with their longitudinal direction parallel to the second direction,
  wherein each guiding track comprises a horizontal part for supporting and guiding the plurality of horizontal movement shelf rollers.

6. The storage tower according to claim 5,
wherein each container support further comprises a plurality of shelf guides being arranged on at least the side of the container support comprising the plurality of horizontal movement shelf rollers, and
wherein each guiding track further comprises a vertical part for guiding of the plurality of shelf guides.

7. The storage tower according to claim 1,
wherein each row comprises vertical guide plates arranged at least partly around a perimeter of each of the at least one opening,
wherein the vertical guide plates are configured so that a storage container being lifted or lowered into the respective opening is aligned in a horizontal plane.

8. The storage tower according to claim 1,
wherein the at least one opening displayed by each row of container spaces is a separate opening, and
wherein the at least one opening of each parallel arranged row of container spaces within the at least one container support are horizontally aligned along the first direction.

9. The storage tower according to claim 1,
wherein the at least one opening displayed by each row of container spaces of at least one of the container supports are merged together to form a continuous opening extending along the first direction to define an area substantially equal to one column of container spaces.

10. The storage tower according to claim 1,
wherein the at least one displaceable container support is displaceable a distance along the second direction substantially equal to $W_f*i$, where i is an integer, preferably i=1 or i=2.

11. The storage tower according to claim 1,
wherein each row displays a plurality of openings distributed with an offset corresponding to d+1 grid cells in the second direction, where d is an integer of 1 or more.

12. The storage tower according to claim 1,
wherein the rows of container spaces of the first and the at least one second container support have equal distributions of the at least one opening.

13. The storage tower according to claim 1,
wherein a lowermost container support has at least one row of container spaces without an opening.

14. The storage tower according to claim 1,
wherein the storage tower further comprises a transport mechanism arranged above an uppermost container supporting framework at a first vertical offset.

15. The storage tower according to claim 1,
wherein the storage tower further comprises a rail system arranged above the first container supporting framework at a first vertical offset.

16. The storage tower according to claim 15,
wherein the rail system comprises a first set of parallel rails arranged in the first direction and a second set of parallel rails arranged in the second direction,
wherein the rail system is aligned with the container supporting frameworks such that each row of container spaces are vertically aligned with the second set of parallel rails.

17. An automated storage and retrieval system configured to store a plurality of storage containers, comprising
a storage tower comprising a plurality of horizontally extending container supporting frameworks distributed with vertical offsets, wherein the plurality of horizontal container supporting frameworks comprises a first container supporting framework and at least one second container supporting framework arranged beneath and extending parallel to the first container supporting framework, wherein each of the first container support framework and the at least one second container supporting framework comprises a horizontally extending container support with principal directions in a first direction and an orthogonal second direction, each container support being configured as a matrix of container spaces with a plurality of columns of container spaces arranged in the first direction and a plurality of rows of container spaces arranged in the second direction, wherein each row of container spaces of the first container supporting framework is configured to receive a plurality of storage containers and displays at least one opening extending along the second direction, the at least one opening having an opening size being at least a maximum horizontal cross section of the storage containers to be stored, wherein the at least one opening of the first container supporting framework and the at least one opening of the at least one second container supporting framework can be aligned vertically with respect to each other, wherein at least one container support is displaceable along the second direction, and wherein at least one container supporting framework further comprises a support displacement device configured to displace the displaceable container support;
a plurality of storage containers supported on the plurality of horizontally arranged container supporting frameworks,
a remotely operated vehicle configured to move laterally above the plurality of container supporting frameworks, wherein the remotely operated vehicle comprises a lifting device configured to grab and vertically lift a storage container, and
a control system configured to monitor and control wirelessly movements of the remotely operated vehicle.

18. The automated storage and retrieval system according to claim 17,
wherein the system further comprises
a storage grid comprising
a plurality of vertical storage columns for stacking storage containers one on top of one another, and
a rail system on which a plurality of container handling vehicles may be operated,
the rail system being arranged above the plurality of storage columns,
wherein storage containers stored in the storage columns are accessible by the container handling vehicles through grid openings in the rail system,
the rail system comprising a cantilever part with a horizontal extent being equal to a difference between the horizontal extent of the rail system and the horizontal extent of the plurality of storage columns,
wherein one or more of the storage towers are at least party arranged below the cantilever part of the rail system and positioned such that each of the container spaces of the first container support can be vertically aligned below a grid opening of the cantilever part.

19. The automated storage and retrieval system according to claim 17,
wherein the system further comprises
a storage grid comprising
a plurality of vertical storage columns for stacking storing containers one on top of another, and a transport mechanism wherein the remotely operated vehicle is a crane being moveable along a sliding bar arranged in parallel to the first direction, the sliding bar having two opposite ends being movable along two fixed bars arranged in parallel to the second direction, the transport mechanism being arranged above the plurality of storage columns, the transport mechanism comprises a cantilever part with a horizontal extent being equal a difference between the horizontal extent of the transport mechanism and the horizontal extent of the plurality of storage columns, wherein one or more of the storage towers are at least partly arranged below the cantilever part of the crane.

20. The automated storage and retrieval system according to claim 17, further comprising a rail system arranged above an uppermost container supporting framework at a first vertical offset.

21. A method for storing and retrieving storage containers from an automated storage and retrieval system, the automated storage and retrieval system comprising a storage tower comprising a plurality of horizontally extending container supporting frameworks distributed with vertical offsets, wherein the plurality of horizontal container supporting frameworks comprises a first container supporting framework and at least one second container supporting framework arranged beneath and extending parallel to the first container supporting framework, wherein each of the first container support framework and the at least one second container supporting framework comprises a horizontally extending container support with principal directions in a first direction and an orthogonal second direction, each container support being configured as a matrix of container spaces with a plurality of columns of container spaces arranged in the first direction and a plurality of rows of container spaces arranged in the second direction, wherein each row of container spaces of the first container supporting framework is configured to receive a plurality of storage containers and displays at least one opening extending along the second direction, the at least one opening having an opening size being at least a maximum horizontal cross section of the storage containers to be stored, wherein the at least one opening of the first container supporting framework and the at least one opening of the at least one second container supporting framework can be aligned vertically with respect to each other, wherein at least one container support is displaceable along the second direction, and wherein at least one container supporting framework further comprises a support displacement device configured to displace the displaceable container support; a plurality of storage containers supported on the plurality of horizontally arranged container supporting frameworks; a remotely operated vehicle configured to move laterally above the plurality of container supporting frameworks, wherein the remotely operated vehicle comprises a lifting device configured to grab and vertically lift a storage container; and a control system configured to monitor and control wirelessly movements of the remotely operated vehicle; wherein the plurality of horizontal container supporting frameworks comprises a number of j parallel container supporting frameworks, where j is an integer of 2 or more, wherein the at least one container support of the at least one second container supporting framework are displaceable along a second direction orthogonal to the first direction, and wherein the method comprises the following steps:

A. moving the remotely operated vehicle to a position where its lifting device is positioned in vertical alignment above either a) a target storage container supported on the first container supporting framework, or b) if the target storage container is situated on one of a j−1 parallel container supporting frameworks beneath the first container supporting framework, a target opening of the first container supporting framework being vertically alignable with the target storage container, B. if the target storage container is not positioned in vertical alignment below the target opening, a) displacing the displaceable container support of the container supporting framework, on which the target storage container is supported in the second direction to position the target storage container in vertical alignment below the target opening of the first container supporting framework or b) if the at least one container support of the first container supporting framework is displaceable along the second direction, displacing the at least one displaceable container support of the one or more container supporting frameworks situated above, and having a same position in the first direction as a row of the displaceable container support, on which the target storage container is supported, an equal distance in the second direction opposite of the direction in a) to position the target storage container in vertical alignment below the target opening of the first container supporting framework or c) if the at least one container support of the first container supporting framework is displaceable along the second direction, displacing both the target storage container supporting displaceable container support as described in step a) and the one or more displaceable container supports as described in step b) to position the target storage container in vertical alignment below the target opening, C. grabbing and lifting the target storage container by use of the lifting device and D. moving the remotely operated vehicle with the target storage container to a horizontally different location.

* * * * *